US010332283B2

(12) United States Patent
McCord

(10) Patent No.: US 10,332,283 B2
(45) Date of Patent: Jun. 25, 2019

(54) VISUALIZED RE-PHYSICALIZATION OF CAPTURED PHYSICAL SIGNALS AND/OR PHYSICAL STATES

(71) Applicant: Nokia of America Corporation, Murray Hill, NJ (US)

(72) Inventor: Alan McCord, San Mateo, CA (US)

(73) Assignee: Nokia of America Corporation, Murray Hill, NJ (US)

(*) Notice: Subject to any disclaimer, the term of this patent is extended or adjusted under 35 U.S.C. 154(b) by 150 days.

(21) Appl. No.: 14/487,944

(22) Filed: Sep. 16, 2014

(65) Prior Publication Data

US 2016/0078657 A1 Mar. 17, 2016

(51) Int. Cl.
| | |
|---|---|
| *G06T 11/20* | (2006.01) |
| *G06T 11/60* | (2006.01) |
| *G06F 7/00* | (2006.01) |
| *G06F 17/30* | (2006.01) |
| *G06T 19/00* | (2011.01) |
| *G06T 15/00* | (2011.01) |
| G06F 11/32 | (2006.01) |
| G06F 9/451 | (2018.01) |
| G06F 3/01 | (2006.01) |
| G06F 3/0484 | (2013.01) |

(52) U.S. Cl.
CPC .......... *G06T 11/206* (2013.01); *G06T 19/006* (2013.01); *G06F 3/011* (2013.01); *G06F 3/017* (2013.01); *G06F 3/04842* (2013.01); *G06F 9/451* (2018.02); *G06F 11/323* (2013.01); *G06T 2210/21* (2013.01)

(58) Field of Classification Search
CPC . G06T 19/006; G06T 2210/21; G06T 11/206; G06F 3/017; G06F 3/04842; G06F 3/011; G06F 11/323; G06F 9/451; H04W 84/18
USPC ................ 345/633, 419, 420, 156; 702/188; 340/600, 525, 870.01
See application file for complete search history.

(56) References Cited

U.S. PATENT DOCUMENTS

| | | | | |
|---|---|---|---|---|
| 6,052,114 | A * | 4/2000 | Morifuji | ................ G06F 3/011 345/156 |
| 7,469,381 | B2 | 12/2008 | Ording | |
| 7,479,949 | B2 | 1/2009 | Jobs | |
| 8,676,743 | B2 | 3/2014 | Kumar | |
| 8,768,873 | B2 | 7/2014 | Kumar | |
| 2003/0174147 | A1* | 9/2003 | Jaffe | ....................... G06F 17/10 345/633 |
| 2005/0219211 | A1* | 10/2005 | Kotzin | ................. G06F 1/1626 345/158 |
| 2005/0219223 | A1* | 10/2005 | Kotzin | ................. G06F 1/1626 345/173 |

(Continued)

OTHER PUBLICATIONS

Geographic information system (Wikipedia entry Jul. 6, 2014), http://en.wikipedia.org/w/index.php?title=Geographic_information_system&oldid=615855614.

(Continued)

*Primary Examiner* — Jin Cheng Wang
(74) *Attorney, Agent, or Firm* — Berkeley Law & Technology Group, LLP

(57) ABSTRACT

Briefly, embodiments disclosed herein may relate to re-physicalization of captured physical signals and/or sensor measurements and to generation of user-perceivable output content from a computing device based at least in part on the re-physicalization.

28 Claims, 18 Drawing Sheets

(56) References Cited

U.S. PATENT DOCUMENTS

| | | | |
|---|---|---|---|
| 2010/0091834 A1* | 4/2010 | Cheung | G01K 1/02 375/240 |
| 2010/0305929 A1* | 12/2010 | Andersen | G06F 19/12 703/11 |
| 2011/0016410 A1* | 1/2011 | Do | A63F 13/60 715/757 |
| 2012/0217736 A1* | 8/2012 | Uyttendaele | B41M 5/267 283/85 |
| 2013/0031142 A1* | 1/2013 | Wester | G06F 9/451 707/802 |
| 2013/0286004 A1* | 10/2013 | McCulloch | G06T 19/006 345/419 |
| 2014/0003666 A1* | 1/2014 | Park | G09B 19/0038 382/103 |
| 2014/0125577 A1* | 5/2014 | Hoang | G06F 3/017 345/156 |
| 2014/0152869 A1* | 6/2014 | Solotko | G06Q 10/10 348/231.3 |
| 2014/0156672 A1 | 6/2014 | Kumar | |
| 2014/0282195 A1* | 9/2014 | Nixon | G05B 23/0216 715/771 |
| 2014/0354534 A1* | 12/2014 | Mullins | G06F 3/015 345/156 |
| 2015/0091941 A1* | 4/2015 | Das | A63F 13/23 345/633 |
| 2015/0097864 A1* | 4/2015 | Alaniz | G06T 19/006 345/633 |
| 2015/0113483 A1* | 4/2015 | Van Der Westhuizen | G06F 3/04812 715/850 |
| 2015/0185599 A1* | 7/2015 | Mullins | H04N 5/93 386/248 |
| 2015/0185826 A1* | 7/2015 | Mullins | G06T 19/006 345/633 |
| 2015/0187108 A1* | 7/2015 | Mullins | G06T 19/006 345/633 |
| 2015/0187138 A1* | 7/2015 | Mullins | G06K 9/00671 345/633 |
| 2015/0235474 A1* | 8/2015 | Mullins | G06T 19/006 345/419 |
| 2015/0338447 A1* | 11/2015 | Gallo | G01R 29/0857 340/600 |
| 2015/0341980 A1* | 11/2015 | Gallo | H04W 84/18 702/188 |
| 2015/0341981 A1* | 11/2015 | Gallo | H04W 84/18 702/188 |
| 2015/0378574 A1* | 12/2015 | Gallo | G06F 3/04842 707/736 |
| 2015/0379765 A1* | 12/2015 | Gallo | G06T 17/05 340/525 |
| 2015/0382084 A1* | 12/2015 | Gallo | H04Q 9/00 340/870.01 |
| 2016/0049005 A1* | 2/2016 | Mullins | G06T 19/006 345/420 |
| 2016/0055674 A1* | 2/2016 | Mullins | G06T 19/006 345/633 |

OTHER PUBLICATIONS

Situation Awareness (Wikipedia entry Jun. 9, 2014), http://en.wikipedia.org/w/index.php?title=Situation_awareness&oldid=612148369.

* cited by examiner

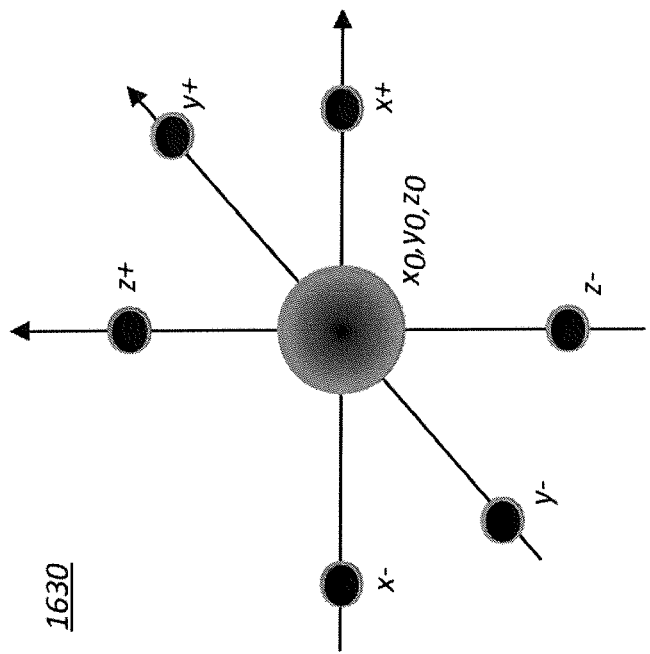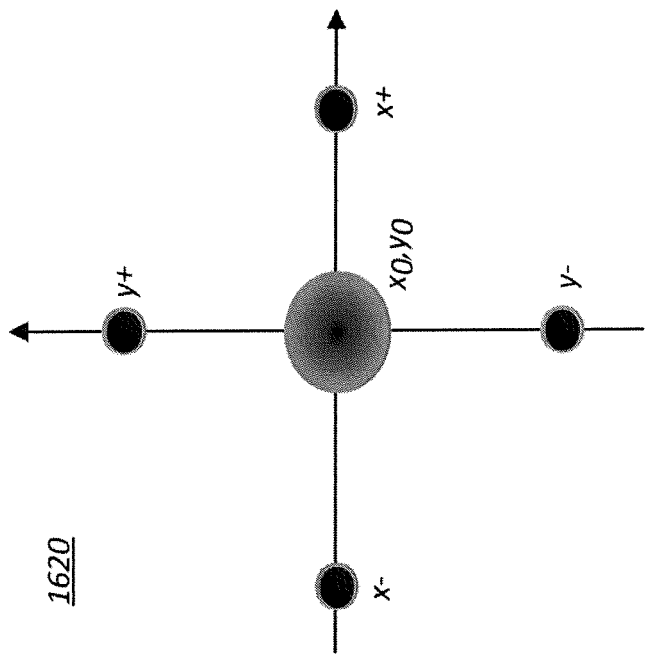
FIG. 16

VISUALIZED RE-PHYSICALIZATION OF CAPTURED PHYSICAL SIGNALS AND/OR PHYSICAL STATES

BACKGROUND

Field

Subject matter disclosed herein relates to re-physicalization of captured physical signals and/or physical sensor measurements, such as, for example, for visualization.

Information

With today's computing and/or sensor technologies, increasingly large amounts of sensor measurement content, such as in which raw sensor measurements, for example, may be converted to a suitable format for user consumption, may be gathered. For example, sensor measurements, such as from an audio sensor, an imaging sensor, an electric current/voltage/frequency sensor, a traffic or flow sensor, a temperature sensor, a pressure sensor, an acceleration sensor, location sensor and/or including many other types of measurement sensors, or any combinations thereof, may contribute to gathering of large amounts of measurements.

Today's visualization technologies typically employ aggregate charts, such as bar charts and/or line charts, for example, and/or may employ display of raw sensor measurements, such as, for example, scatter charts, time series charts, and/or even cartographic (map) projections. These approaches usually intend to provide a visual illustration for human consumption, such as by using a chart and/or a map, as described. Challenges associated with today's visualization technologies may include better scalability of visualizations and/or more efficient communication of large amounts of sensor measurements to a user, including, for example, display of more dynamic content, such as sensor measurement updates in real-time, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 16 is a re-physicalization illustration of an example 2D rendering and an example volumetric (3D) rendering, according to an embodiment.

Figure 1:
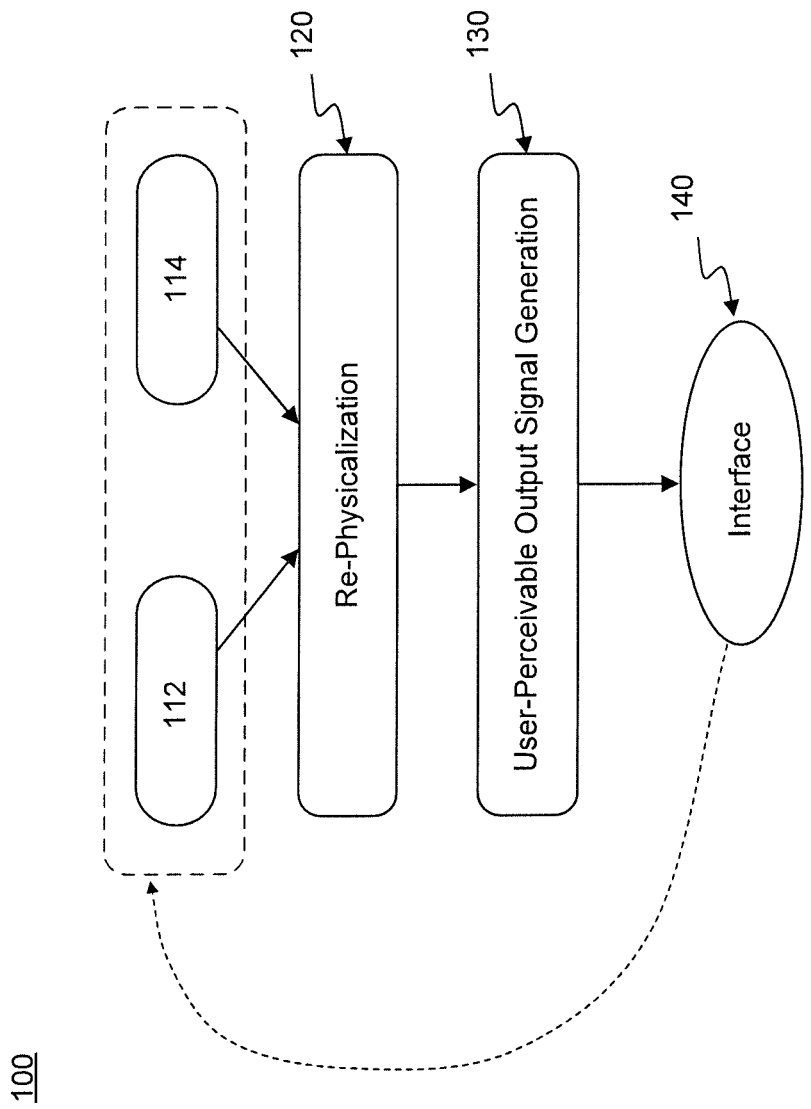
FIG. 1 is an illustration of an example system for re-physicalization, according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms are used to describe any feature, structure, and/or characteristic in the singular and/or are also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

As mentioned, with today's computing and/or sensor technologies, increasingly large amounts of sensor measurements may be gathered and processed for presentation to a user as content in a variety of forms, including displays and/or plots, images, video, text, audio, etc. For example, sensor measurements, such as from an audio sensor, an imaging sensor, an electric current, voltage, and/or frequency sensor, a traffic and/or flow sensor, a temperature sensor, a pressure sensor, and/or including many other types of measurement sensors, or any combinations thereof, may contribute to gathering large amounts of measurements, for example, to be processed into user perceivable content.

Today's visualization technologies may employ aggregate charts, such as bar charts and/or line charts, for example, and/or may employ raw displays of measurements such as, for example, scatter charts, time series charts and/or even cartographic projections on a map, for example. Challenges associated with today's visualization technologies may include appropriate scaling of visualizations and/or more efficiently communicating large amounts of content, such as large amounts of sensor measurement content, to a user, including, for example, dynamic content, that may change in real-time in some cases, for example. As used herein, the term "visualization" and/or similar terms refer to providing computing-generated content (e.g., computing processed sensor measurements) to one or more users in a manner that allows the one or more users to have a capability to perceive generated content using one or more senses. Thus, it is not limited to visual senses. For example, it may include hearing, as an example. Likewise, visualization may comprise displaying, playing, performing, executing, and/or otherwise rendering sensor measurements as content, such as via computing generated graphics, to one or more users to potentially better and/or potentially more effectively aid in human analysis and/or evaluation, in an embodiment, although claimed subject matter is not limited in scope in this respect. Similar to visualization, which includes more than simply visual senses, likewise, displaying and/or similar terms are not limited to human visual perception, but rather are intended to include performing, playing, executing and/or otherwise rendering in a manner to be perceivable by human senses. Thus, it is intended to refer to rendering content in a form so as to be capable of bring perceivable by human senses, including, as examples, sight and/or hearing.

For example, conventional visualization and/or analysis systems may be employed for business intelligence and/or geographic systems, such as, for example, systems designed to capture, store, manipulate, analyze, manage and/or present geographical content, and/or situational awareness systems, for example. Situational awareness systems may include, for example, systems designed to aid in perceiving contextual and/or environmental elements with respect to time and/or space, for example. Conventional visualization and/or analysis systems, for example, such as those categories of systems mentioned above, may comprise, for example, aggregate charts, such as bar charts and/or line charts, for example, raw display of sensor measurements in the form of scatter charts and/or time series charts of one or more variables, for example, and/or a separate "geospatial view" of variables, such as showing points, lines and/or polygons on a map using a cartographic projection and/or some other spatial embedding, for example. Further, conventional visualization technologies may employ user interface menus and/or pointing devices, such as, for example, a computer mouse, to interact with a visualization and/or to make a selection on a chart and/or to draw an area to make a selection on a spatial view and/or to invoke additional processing by a back-end analytical system, for example.

Example challenges that may be faced but not overcome by conventional visualization technologies may include, for example, enabling a user to visually associate content shown on separate charts with content shown on separate spatial maps and/or scaling visualization systems in a manner so as to more efficiently perform evaluation and/or analysis with large amounts of available sensor measurements, including, for example, hundreds, thousands, millions, billions or even greater amounts of samples, including dynamic content. Other example challenges may include better scaling of content in visualization systems, performing more efficiently in a real-time mode, showing more effectively and/or with less delay time evolution of larger amounts of time-dependent variables, supporting analytical decisions by providing real-time suitably processed content from sensors including better support of planning systems and/or more near-term decision support systems. An additional challenge faced by conventional techniques may include allowing non-expert users to make better use of visualization systems, such as in an intuitive way. For example, conventional systems do not generally lend themselves to being intuitively comprehended to support evaluation and/or analysis of large amounts of available sensor measurements. However, it may be desirable for measurements to be processed and/or presented in real-time in a manner that is more intuitive with human experience so that comprehension and/or decision making in light of available measurements may be more accurate, accomplished with less effort and/or with less delay. Of course, these are merely example challenges that may be faced by conventional visualization technologies.

Conventional visualization systems may approach scalability challenges by pre-aggregating and/or filtering before display to a user, for example. Doing so may, therefore, limit user choices and, hence, limit effective use of user intuition to make judgments. Conventional visualization systems may also approach scalability challenges by showing only exceptions and/or detected anomalies to a user. Such approaches to scalability challenges may pre-suppose sets of choices regarding category types and/or extent of anomalies and/or aggregations to be shown, for example. For example, a pre-set limit may be used to filter so that only values beyond a limiting value are visualized. As another example, a visualization may only show counts of anomalies grouped into large spatial regions. Again, doing so may limit user choices and/or limit effective use of intuition that may aid and/or support analysis.

Embodiments in accordance with claimed subject matter may provide techniques to visualize, analyze, evaluate and/or interact with processed content, models, and/or web browser-type content visualizations, including applications, on a computing device, for example, in a manner that may provide visualization approaches that are more intuitive, have improved scalability, and/or may offer some self-executing features to aid comprehension. In addition to visualization, embodiments may include techniques that may allow a user to interact with virtual representations of processed content using one or a combination of human senses, as explained more fully below.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming physical signals and/or states, typically represented as physical electronic and/or magnetic quantities within memories, registers, and/or other storage devices, transmission devices, and/or display devices of a special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In an embodiment, for example, captured physical signals and/or physical states may be re-physicalized, as explained below. Also, in an embodiment, graphics for display may be generated based at least in part on re-physicalization of captured physical signals and/or physical states, as also explained below.

Re-physicalization refers to a type of physical signal and/or physical state transformation that may be made with respect to, as an example, but not necessarily limited to, sensor measurements, such as from an audio sensor, an imaging sensor, an electric current/voltage/frequency sensor, a traffic or flow sensor, a temperature sensor, a pressure sensor, including many other types of measurement sensors, or combinations thereof. As an example, an electrical signal (or series of signals) may be received and/or transmitted that represents a sensor measurement. Likewise, if the signal is stored, such as in memory, it may become a physical state, such as a memory state (e.g., that represents a sensor measurement). A typical, non-limiting, example may include one or more signal packets in which a payload of a packet, for example, represents one or more sensor measurements in a binary digital signal form.

Re-physicalization in this particular context, more specifically, refers to assigning additional or replacement physical attributes to affected signal(s) and/or state(s) in which those attributes being assigned relate to physical manifestations capable of being emulated, such as in accordance with specified virtual physical laws, at least partially in accordance with the particular measurement of the affected signals and/or states. Therefore, attributes being manifested may relate to, but nonetheless, be in addition to or instead of existing signal and/or state attributes prior to re-physicalization.

Thus, in this context, re-physicalization transformation permits a signal and/or state to acquire a form in which it may be capable of being perceived more easily and/or more effectively by human senses. A potential benefit, as described in more detail later, includes a potential for a capability to comprehend measurements using forms of human intuition that may relate to human experience about the physical world. Some of these intuitions, for example, may have developed over thousands of years of human evolution, for example; whereas in the absence of re-physicalization, comprehension regarding measurement content of a signal and/or state might be more difficult to accomplish in a meaningful manner and/or in a speedy manner.

In this context, terms including "physical world", "physical laws", real world", "actual world" and/or similar terminology refer to physical manifestations capable of being experienced by human senses and also measurable by sensors in accordance with physical laws that are currently believed to govern physical events and/or phenomena. Thus, sensors are able to collect measurements about the "physical world" in accordance with "physical laws" that govern. As an example, the laws of motion are believed to be well-understand and govern motion in the physical world; thus, an accelerometer, as an example, is able to collect measurements substantially in accordance with such laws. There are a host of other such physical law examples.

By contrast, in this context, the term "virtual environment", "virtual world" and/or similar terms refers to an environment that exists through computing, graphics and/or through creation of content capable of being perceived through human senses, such as sight and/or hearing, for example. However, it otherwise does not exist in the so-called physical world, but may be a representation at least in part of aspects of the physical world. Thus, for example, an animation playable on a display system provides an example of a virtual world. Typically, a virtual environment, although not necessarily limited by physical laws governing the physical world, may nonetheless mimic aspects of the physical world. Although in some contexts, this may have been done in the past for entertainment value, such as in computer gaming; for example, here it is done at least in part as a potential aid to human comprehension, as alluded to previously. Thus, in this context, terms such as "virtual physical object" and/or "virtual physical law" refer to mimicking aspects of the physical world within a virtual world and/or virtual environment. Likewise, physical attributes of the physical world, such as temperature, mass, volume, etc. may be mimicked in a virtual world as virtual physical attributes.

Thus, as discussed in more detail below and illustrated through various examples, re-physicalization in this context refers to a process in which sensor measurements about physical attributes of the physical world are collected and transformed in a manner so as to reflect additional and/or different attributes than the physical attributes of the physical world that the measurements initially characterized, while nonetheless preserving reasonable consistency with initially collected 'physical world' measurement attributes. For example, measurements collected may be transformed to represent, in addition, different physical attributes (e.g., virtual physical attributes) about the physical world, or may be transformed to represent, in addition, virtual attributes that do not exist in the physical world, but are capable of being represented in a virtual world as content perceivable by a user, such as by being displayed, played, performed, executed and/or otherwise rendered. Again, as suggested and explained in more detail, such as by example illustrations, transformation to another form and/or additional form perceivable by a user, for example, may potentially result in better and/or faster human comprehension. Of course, illustrative examples provided below are intended to be within claimed subject matter; however, claimed subject matter is not limited to illustrative examples.

It is noted in this context that physical manifestations capable of being emulated through re-physicalization are intended to behave substantially in accordance with actual, known physical manifestations. Likewise, however, physical manifestations to be emulated through re-physicalization also have a potential to behave in accordance with non-physical manifestations (e.g., virtual manifestations) that are not known and/or do not exist. To be more specific, physical signals and/or states may be re-physicalized in a manner that may be in accordance with a virtual world, rather than simply the real world (e.g., physical world).

Thus, in this context, re-physicalization refers to transformation of one or more signals and/or states in which affected signals and/or states are projected from the physical or real world into a virtual world, which by design, includes principles, natural and/or non-natural, that may affect that virtual world. The virtual world, nonetheless, as indicated, is capable of being experienced through human senses, such as visually and/or sonically, not unlike animation, although, here, unlike animation, one or more underlying real world physical signals and/or physical states are being represented so that measurement content in the form of one or more signals and/or states may be more easily comprehended using intuition and/or experience related to human senses.

Thus, re-physicalization may provide one or more potential benefits. These include leveraging existing technology so that sensor measurements, for example, may be captured and represented in real-time to a user through a re-physicalization transformation that permits a user to view real-time or current measurements; however, re-physicalization, as discussed in more detail by examples below, may also permit sensor measurements to be presented in a manner for quicker and/or easier human consumption, and/or even perhaps deeper comprehension, as a result of intuition and/or experience that may relate to use of human senses.

FIG. 1 is an illustration of an example embodiment 100 of a system for re-physicalization, including an example embodiment 120 of a re-physicalization module and an example embodiment 130 of a user-perceivable output generation module. It is noted that "module" and/or similar terminology refers to executable instructions installed on one or more computing device; however, a module may likewise comprise firmware, hardware, or a combination of the foregoing. As used herein, "user-perceivable output signals" comprise output signals, such as from a computing device that may be played, performed, executed, displayed and/or otherwise rendered in a manner to be experienced by one or more senses of one or more users. For example, in an embodiment, user-perceivable output signal generation module 130 may comprise a graphics generation module that is able to generate signals for a display.

Also, in an embodiment, one or more identified content objects (ICO), such as 112 and/or 114, may be re-physicalized via re-physicalization module 120, for example. In one or more embodiments, the term "identified content object" (ICO refers to a binary digital signal representation of physical signal content collected from physical objects and/or events, for example, that may have been transformed into a digital signal form; a binary digital signal representation of virtual content that may have been generated, or a binary digital signal representation of a combination. Thus, ICOs may comprise sensor measurements in binary digital signal form as a result of signal transformation and/or signal processing, for example.

In an embodiment, re-physicalization module 120 may generate one or more virtual physical objects (VPOs) based at least in part on one or more ICOs, such as 112 and/or 114, and/or attributes thereof. The term "virtual physical object" (VPO) and/or similar terms refer to a binary digital representation of content endowed with one or more physical properties in a virtual environment (e.g., virtual physical properties). For example, sensor measurements and/or ICOs, which comprise sensor measurements in binary digital signal form, for example, may have been collected from physical objects and/or events and may have been transformed to be rendered for a virtual environment or may have been transformed so as to be renderable for a virtual environment. Likewise, virtual physical properties may be generated for a VPO without an underlying physical world basis. As suggested, in an embodiment, a VPO may comprise one or more ICOs that may have additional or replacement virtual physical properties, for example. Also, in an embodiment, a VPO may be generated, such as via executable instructions in one example embodiment, to follow specified virtual physical laws, such as, for example, virtual physical laws of motion. One or more individual VPOs may also interact in a virtual environment that is capable of being executed via a computing device, for example.

In an example embodiment, one or more VPOs may be implemented as part of one or more particle systems executable by a computing system and/or device. For example, a particle system may be executed utilizing one or more graphics processors. As an example, a video game and/or computer game type engine, in an embodiment, may be implemented on a computing system. In this context, the terms "video game," "computer game," "PC game" and/or similar terms refer to a game executable on a general purpose computing device, such as a computer. For convenience, the term "game" may be employed to refer to the foregoing. Likewise, a game type engine and/or similar terms, therefore, in this context, refers to executable instructions providing a framework for development of games (e.g., video games, computer games, PC games, etc.)

A system may, in an embodiment, utilize one or more particle systems in a quantitative and/or qualitative manner to re-physicalize content, such as for visualization, so as to enable users to more easily comprehend complex and/or dynamic types of content. In an embodiment, particles implemented as one or more VPOs, for example, may comprise a range of characteristics, including, but not limited to, size, color, shape, texture, transparency, mass, density, charge, and/or lifetime, for example. However, claimed subject matter is not limited in scope to illustrative examples, such as the foregoing.

For an example embodiment, as depicted in FIG. 1, re-physicalization module 120 may determine an evolution and/or appearance for one or more VPOs in a virtual environment in accordance to one or more specified virtual physical laws, for example. Also, in an embodiment, re-physicalization module 120 may also mediate interactions between VPOs and user(s) of a system. In an embodiment, re-physicalization module 120 may comprise a process that may, for example, employ a variety of techniques, such as from computer science, artificial intelligence, computational theory, control theory, system theory, etc., in a manner to generate and/or manage re-physicalization, such as re-physicalized visualizations, for example. Embodiments disclosed herein may provide a variety of new types of capabilities including, for example, "self-organization" of VPOs with or without guidance from a user, easier visual association between chart-style views and/or spatial/geospatial type (e.g., map) views, improved techniques for selecting subsets of content, and/or goal/objective enhancement in a manner so that that a user may, if desired, direct, monitor and/or assign computational resources, for example, to a process for managing performance, to provide a few sample examples.

Example embodiment 100 of a re-physicalization system may comprise an interface, such as user interface 140, for example, that may provide mediation between user actions and/or gestures taking place in a physical world that nonetheless may affect one or more VPOs within a virtual world, for example. Thus, an interface, such as 140, may provide mediation between VPOs in a virtual world and user actions and/or gestures in a physical world. Also, referring again to user-perceivable output signal module 130 (also referred to as output signal module), for example, a user may experience re-physicalization via 2D and/or 3D visual displays, and/or may also experience re-physicalization through visualization which may include other human senses in addition to visual sensing, as previously mentioned, including, for example, sound (e.g., audio sensing) and/or physical feedback (e.g., tactile sensing), in an embodiment. Likewise, re-physicalization may also be experienced by a user by way of a virtual physical representation other than a virtual environment generated via a display coupled to a computing device. For example, 3D printing may perhaps be employed.

Although one or more embodiments described herein may provide re-physicalization by way of visualization, claimed subject matter is not limited in scope in these respects. For example, in an embodiment, through example techniques for re-physicalization of one or more identified content objects, a user experience may take or include non-visual form, such as, for example, as previously explained. In this sense, re-physicalization of ICOs may be understood to comprise ICOs taking a virtual physical form in a virtual environment, such as may be provided via a computing device, for example, coupled to a display, and may also be understood to comprise expressing a virtual physical form of an ICO to a user, such as by playing, executing, performing and/or otherwise rendering for human senses, as previously discussed.

Embodiments in accordance with claimed subject matter may be utilized for a broad range of content types including, but not limited to, raw content, time-series content, pre-analyzed (aggregated) content, structured content, semi-structured content, unstructured content, and/or modeled content, including machine-learning and statistical model type content, for example. Embodiments in accordance with claimed subject matter may also be utilized in "batch" modes, "streaming" modes, and/or "micro-batch" modes. Example systems that may provide streaming and/or micro-batch content may include Apache Storm, Apache Spark, and/or message queuing systems, although claimed subject matter is not limited in scope in these respects.

Additionally, embodiments may be implemented utilizing a wide variety of devices and/or interfaces, such as, for example, small personal computing devices and/or large wall board displays that may be found in some situations in operations control rooms. Embodiments in accordance with claimed subject matter may also be implemented in a distributed manner across multiple computing devices, for example.

In an embodiment, intuitive understanding and/or interactive ease of use may be derived from assignment of physical properties, such as, for example, physical laws of motion, to govern behavior of virtual objects in a way that may mimic properties and/or behaviors of physical objects, even if an underlying content object and/or model may not correspond to a physical object currently known to exist in the physical world.

Figure 2:
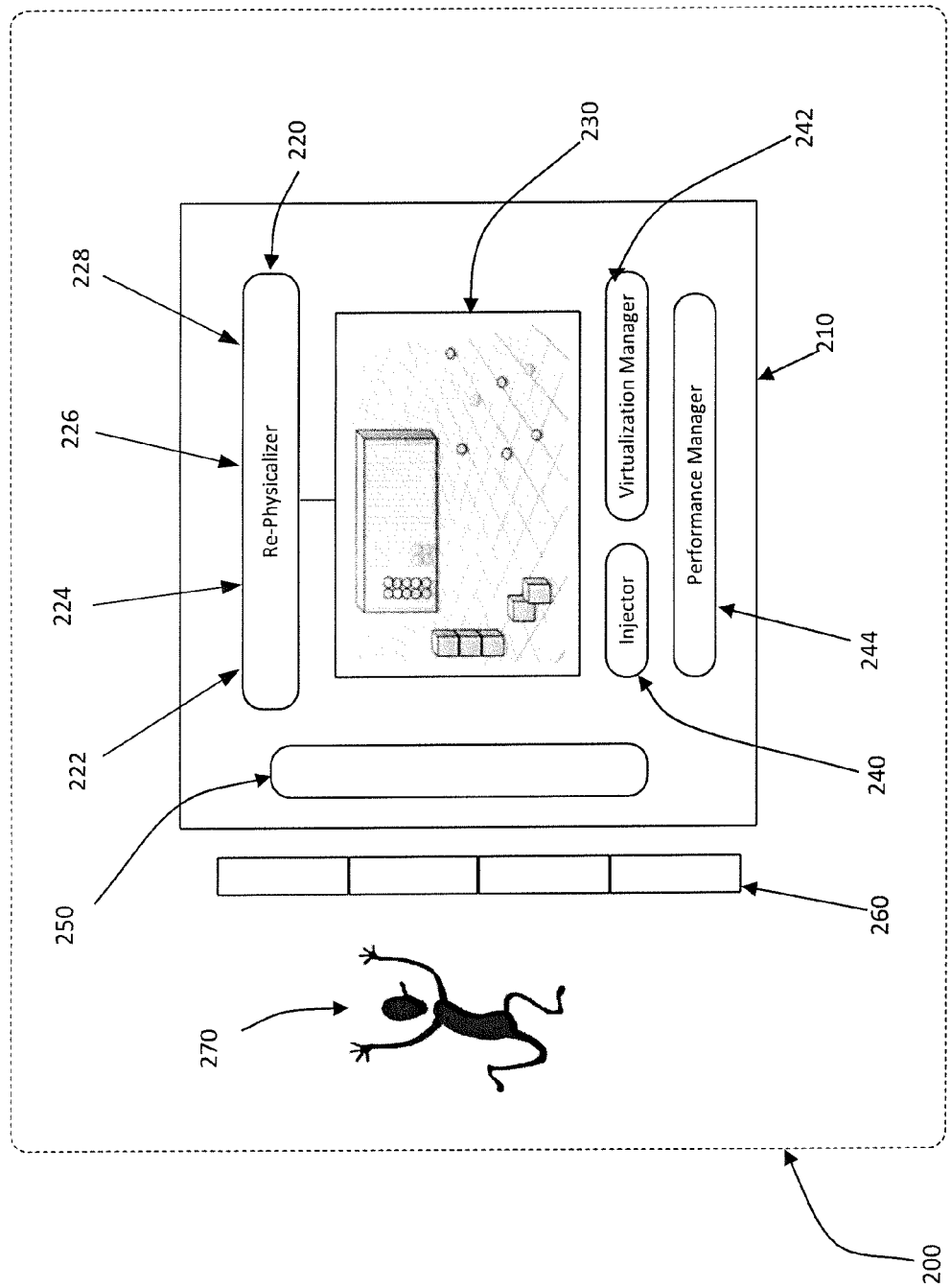
FIG. 2 is an illustration of another example system for re-physicalization, according to an embodiment.

FIG. 2 is an illustration of an example system for re-physicalization, according to an embodiment. In an embodiment, a user, such as user 270, may exist in physical world 200. User 270 may interact with a virtual environment, such as virtual environment 230, by way of one or more interfaces, such as user interfaces 260, for example. In an embodiment, virtual environment 230 may comprise an executable application on a computing device, such as computing device 210. Also, in an embodiment, interactions between virtual environment 230 and physical world 200, such as virtual to physical or physical to virtual, may be managed by one or more interface managers, such as, for example, interface managers 250, in an embodiment. Further, although some embodiments described herein may mention a single virtual environment, other embodiments may extend to multiple virtual environments, including, for example, hidden virtual environments and/or parallel virtual environments, for example.

In an embodiment, a wide range of ICO types may be handled in a system in which re-physicalization takes places, such as the example system depicted in FIG. 2, for example. ICO types may include, for example, raw and/or aggregated content entering a system via streaming, for example, as depicted with streaming ICOs 222, and/or may be loaded into a system in a batch mode, for example, such as depicted with batch-mode ICOs 224, in an embodiment. An example computational environment for combining batch and/or stream operations may comprise an Apache Spark environment, in an embodiment, for example.

ICOs may originate from and/or may be generated from measurements relating to one or more physical manifestations and/or phenomena, such as may be provided by one or more sensors, in an embodiment. For example, sensors located in cellular telephones, other mobile electronic devices and/or other computing devices may provide ICOs and/or measurements for use in generation of one or more ICOs, in an embodiment, although claimed subject matter is not limited in scope in these respects. Also, in an embodiment, a system employing re-physicalization may include content objects in other more complex forms and/or higher level forms, such as content objects 226s that may, for example, be generated externally and/or previously, for example. Other visual representations of content, such as visualization content objects 228, may comprise, for example, a static bitmap visualization and/or other image, a video, and/or a uniform resource locator (URL) of content in a web-browser type visualization form. For example, a URL of content in a web-browser type visualization form may comprise a chart generated on a business intelligence system, in an embodiment. Of course, claimed subject matter is not limited in scope to particular examples described herein.

In an embodiment, a re-physicalizer, such as re-physicalizer component 220, may assign a virtual physical object (VPO) of a specified type and/or with a specified set of physical properties to particular ICOs. In a situation wherein one or more VPOs are present in a virtual environment, such as virtual environment 230, re-physicalizer 220 may update virtual physical properties, as appropriate, based at least in part on more recent sensor measurements, for example. However, at least in part in response to a determination that an appropriate VPO is not present and/or has not been generated, re-physicalizer 220 may signal to an injector component 240 to generate one or more VPOs. Generated VPOs may then be placed or injected into a virtual environment, such as 230, for example. Over time, one or more VPOs may evolve and/or behave substantially according to a set of principles specifically created for the virtual environment in which the VPOs reside. These principles may be managed at least in part by a virtual environment manager (also called a virtualization manager), such as 242, in an embodiment.

Also depicted in FIG. 2 in an illustrative system is a performance manager, such as performance manager 244. In an embodiment, performance manager 244 may operate to manage performance at least in part in accordance with one or more specified performance measures. A user may benefit at least partially due to an at least approximate correspondence between a virtual environment situation and a physical world situation. For example, sensors monitoring various aspects of an energy grid may provide sensor measurements to re-physicalizer 220, which may include and/or result in ICOs, for example. Thus, VPOs may be placed into virtual environment 230 by injector 240 related to sensor measurements and/or ICOs. VPOs associated with the energy grid may operate within virtual environment 230 in accordance with virtual physical laws, which may be managed by virtual environment manager 242, in an embodiment. Performance manager 244 may operate substantially in accordance with a variety of possible performance measures, which may, for example, at least in part reduce costs associated with energy generation and/or distribution, reduce volatility of energy generation from renewable sources, reduce risk and/or reduce associated impacts of certain undesirable energy grid related events and/or provide other beneficial effects, although claimed subject matter is not limited in scope in these respects.

Figure 3:
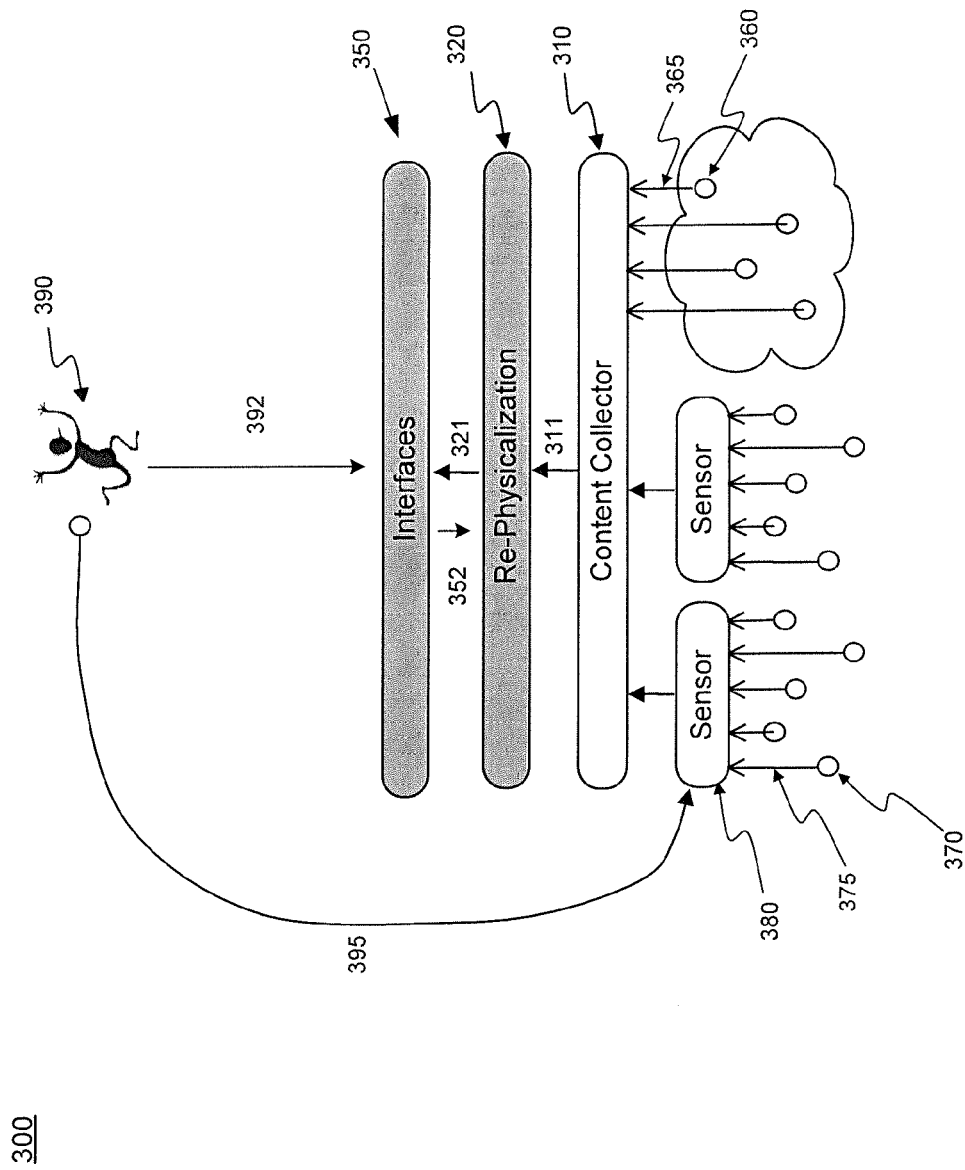
FIG. 3 is a schematic diagram of an example process for re-physicalization, according to an embodiment.

FIG. 3 is a schematic diagram of an example embodiment 300 of a re-physicalization process. In an embodiment, sensors, such as sensors 380, may collect ICOs, such as ICOs 375, generated and/or collected from physical objects and/or events, such as 370. Also in an embodiment, sensor measurements and/or ICOs may be provided from one or more sensors, such as sensors 380, to a collector component for collecting measurements and/or ICOs, such as 310. Further, virtual ICOs, such as ICOs 365 may be generated in connection with virtual objects, events, and/or content sources 360, may also be provided to 310, in an embodiment.

Embodiment 300 of an example process for re-physicalization may thus include a re-physicalization component 320 that may receive ICOs, indicated by arrow 311, from collector 310 to generate one or more VPOs, for example. Re-physicalization component 320 may generate one or more VPOs, indicated by arrow 321, based at least in part on ICOs 311, received from content collector 310, for example. In an embodiment, a re-physicalization component may generate one or more virtual physical manifestations, such as for one or more VPOs. Thus, 320 may generate one or more VPOs, such as for a virtual environment, for example, to be executed on a computing device, in an embodiment. An evolution component (not shown), which may be included within 320, in an embodiment, may manage behavior of one or more VPOs, within a virtual environment. An evolution component may also manage evolution and/or aging of content objects, such as one or more VPOs, for example, and/or may also manage retention activities for one or more VPOs, in an embodiment, discussed in more detail later by example.

In an embodiment, a user, such as user 390, may interact with one or more VPOs, for example, such as those present within a virtual environment, by way of one or more interfaces 350. For example, user 390 may interact with a visualization of a virtual environment on a display coupled to a computing device in an embodiment, and/or may provide content input by way of a pointing device, such as, for example, a computer mouse, although claimed subject matter is not limited in scope in these respects. Of course, other types of user interactions are possible in one or more embodiments.

For example, a spatial contouring visualization may be generated and/or may be displayed to user 390 by way of one or more interfaces, such as 350. Conversely, in an embodiment, a physical interaction from user 390, such as, for example, a mouse click and/or hand gesture, may be translated into an appropriate virtual effect and/or action for a virtual environment by re-physicalization component 320. Additionally, in an embodiment, user 390 may interact with one or more sensors 380, such as, for example, directing a camera, to provide additional ICOs to content collector 310, for example. Thus, a user may act on a system, such as 300, by way of interfaces 350. Further, in an embodiment, a user may be monitored, for example, by sensors, such as sensors 380, that may generate one or more ICOs, such as for system 300 in this example. Thus, for an embodiment, an end user, such as 390, may be sensed like any of a wide range of other physical objects, in an embodiment. For example, sensors may also include cameras that may be utilized to track user movements, and/or may include bio-sensors to monitor a user for biological indicia, such as heart rate, respiration, temperature, etc., for example. Additionally, devices for measuring brainwaves (e.g. via EEG) and/or emotional state of a user may be utilized to generate one or more ICOs in an embodiment. Also, in an embodiment, a sensor may include a magnetic resonance imaging (MRI) system. For example, an MRI may map and/or detect brain activity that may provide measurements and/or ICOs to be re-physicalized, in an embodiment.

In an embodiment, one or more virtual physical objects may comprise any of a wide range of VPO types. For example, in an embodiment, a "VPO" may comprise one or more individual objects, such as based at least in part on an individual or multiple ICOs, for example. An "aggregate VPO" may comprise one or more aggregates of multiple content objects, for example. A "model VPO" may comprise one or more statistical models, including one or more machine learning models, for example. A "combination VPO" may, for example, comprise one or more models based at least in part on a combination of at least two of the following: one or more content objects, one or more aggregate content objects, and/or one or more statistical models.

Also, in an embodiment, a "selector VPO" may select one or more other VPOs and/or "spatial" areas of a virtual environment as a result of contact, proximity, and/or collision with one or more other VPOs, for example. Additionally, in an embodiment, an "embedded VPO" may comprise one or more signal and/or state values at one or more locations in an embedded space in a virtual environment. In this context, "embedded space" and/or similar terms refer to a virtual physical space in a virtual environment that may be embedded within another virtual physical space (verify). For example, a two-dimensional embedded space may comprise a grid of VPOs that may comprise discretized signal and/or state values of one or more continuous signals, for example, across a plane. One or more embedded VPOs may also represent non-continuous signals and/or states, of course, in an embodiment, including combinations of continuous with non-continuous signals and/or states. One or more embedded VPOs comprising non-continuous signals and/or states may be utilized, for example, in a social-network type diagram and/or as vertices in a graph (e.g., signal flow graph), for example. Of course, claimed subject matter is not limited in scope in these respects.

Additional VPO types may include, for example, a "browser VPO" that may comprise an embedded web browser in a virtual environment, in an embodiment. A "projection VPO" may comprise a projection of one or more VPOs in higher dimensions to fewer dimensions, such as to one, two, or three virtual dimensions plus a virtual time dimension for visualization and/or animation, in an embodiment. Further, an "action VPO" may comprise a VPO utilized for at least partially controlling and/or at least partially triggering actions, such as with respect to one or more other VPOs, for example. Also, in an embodiment, an "asset VPO" may comprise a representation one or more relatively large physical objects, such as, for example, heavy equipment. For example, an asset VPO may represent a building, vehicle, a power transformer, etc. Again, claimed subject matter is not limited in scope in these respects.

Further VPO types may include a "resource VPO" that may comprise physical resources that may be assignable to one or more physical tasks, in an embodiment. For example, a resource VPO may comprise people, equipment, buildings, etc. Another example VPO type may include a computing resource VPO. In an embodiment, a computing resource VPO may comprise computing and/or computer type resources that may be tasked, for example, to implement a virtual world/environment. Example resource VPOs may include, but are not limited to, central processing unit(s), graphics processing unit(s), memory, including secondary storage, etc. An "environmental VPO" may represent one or more elements of a physical environment, in an embodiment. Example VPOs, such as those mentioned above, may enable a user to visualize within a virtual environment progress and/or evolution of a process, approach, and/or technique ahead of engaging in physical implementation, for example. Additionally, a user may monitor progress of a virtual process comprising one or more VPOs in a virtual environment and/or may interact with one or more VPOs in a virtual environment to, at least in part, affect progress of a virtual process, for example, as a potential aid to understanding.

In an embodiment, a VPO may be generated at least in part in response to any of a number of situations, conditions, and/or actions. For example, a VPO may be generated at least in part in response to receiving one or more ICOs and/or to one or more actions initiated a user, in an embodiment. One or more VPOs may also be generated at least in part spontaneously by self-generation, and/or may be generated from another VPO, in an embodiment. Also, in an embodiment, one or more VPOs may be generated at least in part by a process that may generate one or more VPOs, for example, at specified times and/or at specified rates per units of time, for example. Additionally, one or more VPOs may be generated at least in part as a by-product of a reaction of two or more other VPOs that may interact within a virtual environment and/or may be generated at least in part in response to a deterministic and/or statistical process, for example, in an embodiment. Again, claimed subject matter is not limited in scope to specific examples mentioned herein.

Additionally, in an embodiment, one or more VPOs may exist for a finite amount of time. For example, one or more VPOs may be destroyed, terminated and/or simply cease, such as at least in part in response to one or more incoming ICOs and/or in at least in part in response to consumption over time, in an embodiment. Likewise, one or more VPOs may be destroyed, terminated, and/or cease after passage of a specified amount of time. For example, a VPO may decay at least in part over a period of time, and/or may cease completely from decay over a period of time, for example. Decay and/or other characteristics for a VPO related to a VPO being terminated, destroyed and/or ceasing within a virtual environment may be made a property of a VPO, such as, at VPO generation, in an embodiment.

In another embodiment, virtual physical properties of particles (e.g., one or more VPOs) may include reactive and/or chemical-type properties. For example, two particles of different types may react and "cancel each other out" such that they may be removed from a virtual environment. In an alternative embodiment, two particles of different types may combine to form a third particle type, for example.

Further, in an embodiment, one or more VPOs may exit from a virtual environment via a "sink," which may comprise a specified characteristic of a virtual environment, for example. In another example, in an embodiment, one or more VPOs may be consumed at least in part in a reaction with one or more other VPOs and/or may be explicitly removed at least in part in response to user action. In one or more embodiments, techniques to destroy, terminate, cease and/or remove one or more VPOs may be implemented as part of a content retention policy, discussed later as an illustration, although claimed subject matter is not limited in scope in these respects.

As mentioned above, virtual physical properties and/or virtual laws of motion governing one or more VPOs may enable a user to interact with one or more VPOs through one or more interfaces. For example, a user may interact with one or more VPOs through physical gestures on a touch-sensitive interface, in an embodiment. Additionally, as also mentioned above, one or more VPOs may interact with each other and/or may self-organize without human user intervention, in an embodiment. Further, in an embodiment, one or more individual VPOs and/or one or more groups of VPOs may evolve into structures within a virtual environment for a variety of reasons, including, as an example, at least in part for purposes of user interpretation and/or user interaction, for example. In an embodiment, VPO structuring for purposes at least in part of user interpretation and/or interaction with may occur at various levels of a hierarchy, also discussed later by illustration.

In one or more embodiments, several aspects of "time" may be employed in connection with a re-physicalization implementation. For example, physical time may be represented, time within a particular virtual environment may be represented, and what may be referred to as "wall-clock time" may be included. In an embodiment, physical time may comprise a time stamp, such as marking a point in time at which a sensor measurement may be captured, for example. Also, in an embodiment, for a virtual environment, a virtual passage of time may occur that does not necessarily correspond to physical time. In an embodiment, time in a virtual environment may affect, at least in part, evolution of one or more VPOs according to specified virtual physical laws. Further, in an embodiment, wall-clock time may refer to a point in time experienced and/or observed by a user in a physical location where the user may be physically present. Embodiments in accordance with claimed subject matter may make use of some, all, or none of the various aspects of time described herein. In an embodiment, visualizations, for example, may be executed, performed, played and/or otherwise rendered at rates slower, faster, and/or equal to physical passage of time. For example, time in a virtual environment may run slower, faster, and/or equal to physical time. Likewise, differences between physical and virtual time may include a time offset (e.g., one hour), a fixed ratio (e.g., 100 seconds of virtual time is 1 second of physical time), and/or a variety of other approaches. In an embodiment, flexibility such as the foregoing may enable more than simply speeding up or slowing down of a visual replay. Rather, for example, by enabling time evolution under laws of a virtual environment, a quasi-steady state, for example, may be achieved, such as within a small increment of physical time.

Further, in an embodiment, an individual VPO may be converted from one type to another and/or may have one or more characteristics altered at least in part in response to changes as a result of sensor measurements, for example. For example, one or more VPOs may change type and/or may have one or more characteristics altered at least in part in response to additional measurements, tests, and/or classifications of measurement content, in an embodiment.

Figure 4:
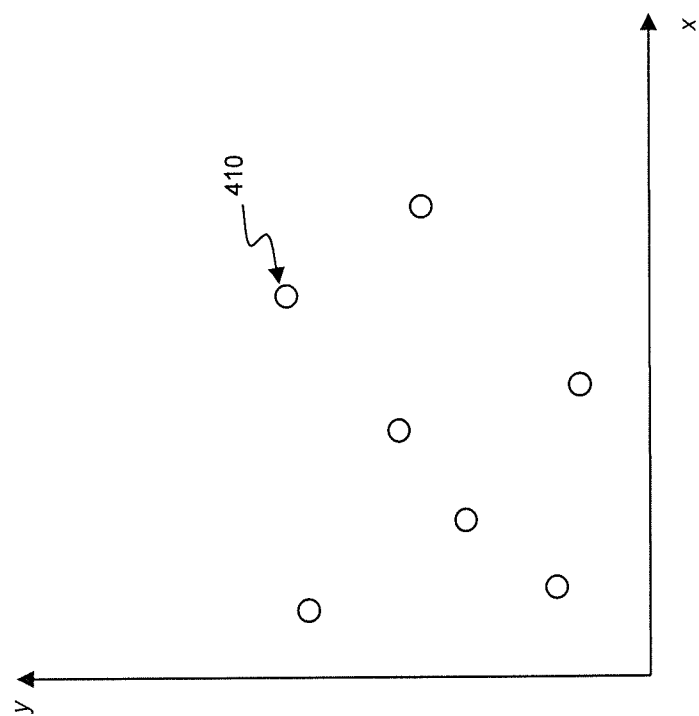
FIG. 4 is an illustration of example sensor measurements for re-physicalization in a two-dimensional space, according to an embodiment.

FIG. 4 is an illustration depicting example discrete points for a re-physicalization example, such as points 410, representative of respective example measurement content in a two-dimensional space 400, according to an embodiment. For the example depicted in FIG. 4, content measurement values are depicted as being known at particular locations. In an embodiment, points 410 may comprise ICOs derived at least in part from sensor measurement components and/or characteristics of an energy grid system. For example, individual ICOs may comprise measurements in signal form generated from sensors regarding, as examples, voltage, current, and/or temperature, and/or may comprise physical characteristics of an energy grid, such as transformer type and/or location, in an embodiment. Of course, this is merely one sample illustration, and claimed subject matter is not limited in scope to illustrations.

Figure 5:
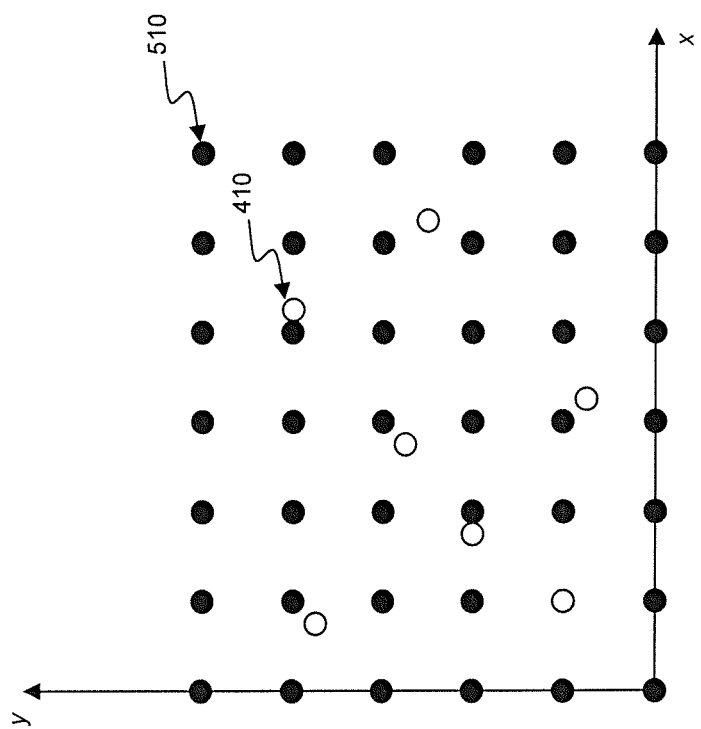
FIG. 5 is an illustration of example sensor measurements and embedded particles in a two-dimensional space for re-physicalization, according to an embodiment.

FIG. 5 is a further illustration of example points, such as points 410, juxtaposed with example embedded particles, such as embedded particles 510, in a two-dimensional space for a re-physicalization example, according to an embodiment. At FIG. 5, points 410 representing respective ICOs are depicted as they are in FIG. 4. However, FIG. 5, in an embodiment, further introduces a spatial grid of "embedded" particles 510. In an embodiment, as an illustrative, but non-limiting example, individual embedded particles of a spatial grid of particles may result in re-physicalization of FIG. 4 ICOs, such as with one or more properties generated as a function of distance between individual points 410 and individual embedded particles to generate spatial contouring comprising a plurality of VPOs, for example. In an embodiment, as mentioned, points 410 may comprise content measurements associated with an energy grid, although claimed subject matter is not limited in scope in this respect.

Figure 6:
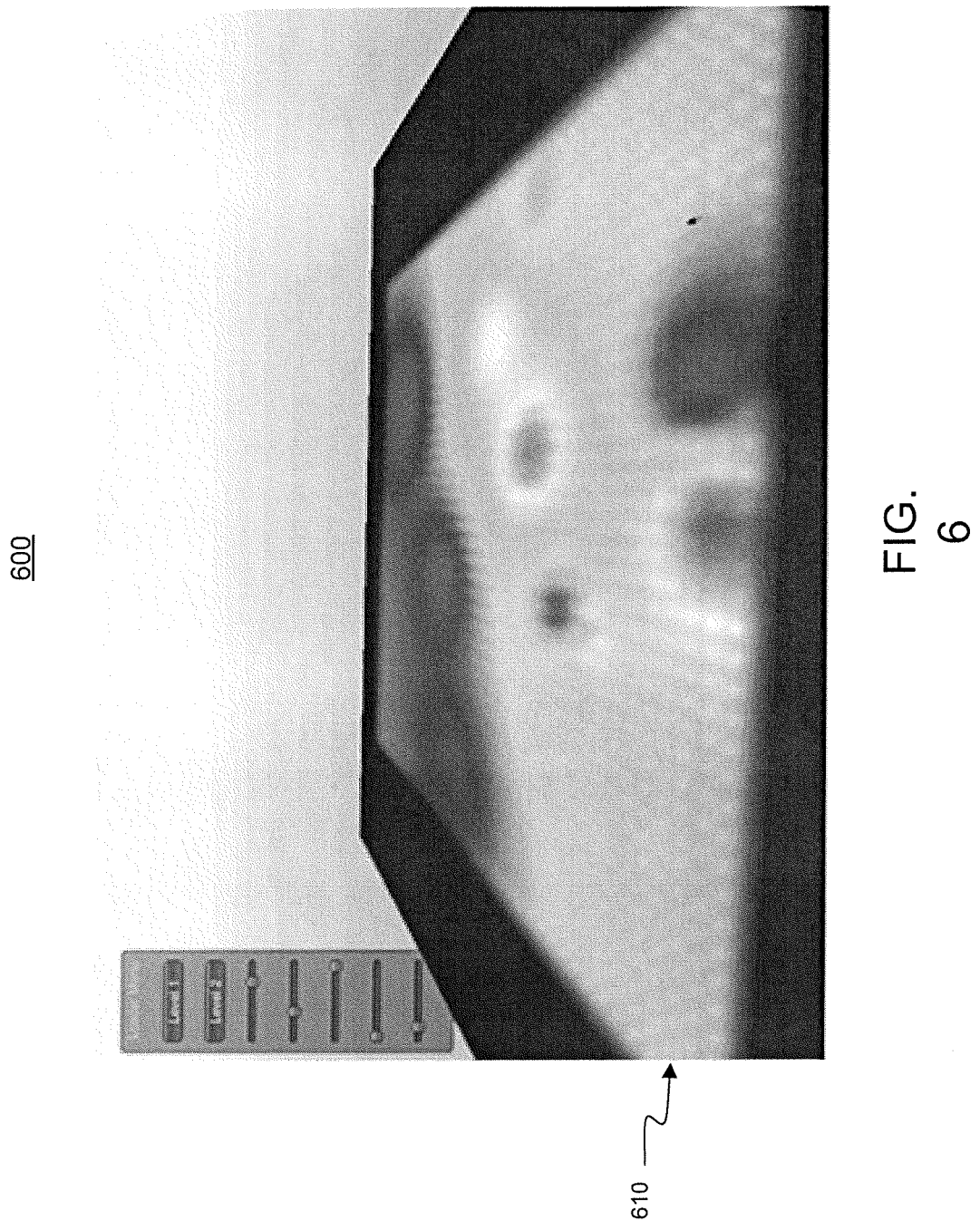
FIG. 6 is a re-physicalization illustration using spatial contouring, according to an embodiment.

FIG. 6 is an illustration of spatial contouring as a result of re-physicalization, according to an embodiment. For the example, in FIG. 6, an embedded grid 610 may be based, at least in part, on a sum over points 410 of a function of distance between individual embedded particles 510 and respective points 410, in an embodiment. Thus, in this illustration, greyscale coloring of embedded particles 510 in FIG. 6 visually depicts influence of points 410 over distance by visualizing embedding particles 510. For the example of FIG. 6, points 410 are not expressly depicted. Rather, locations of points 410 may be visually inferred from the centers of spatial patterns generated from re-physicalization of embedding particles 510, in an embodiment. Although publishing restrictions limit use of color in patent figures, an embodiment may, for example, include full coloring, transparency and size of embedding particles 510 instead of just greyscale level. Thus, attributes of embedding particles 510 in an embodiment may comprise a vector function of an embedded space and underlying points 410. Again, claimed subject matter is not limited in scope to particular examples and/or illustrations described herein.

As previously discussed, re-physicalization in this particular context, more specifically, refers to assigning additional or replacement physical attributes to affected signal(s) and/or state(s) in which those attributes being assigned relate to physical manifestations capable of being emulated, such as in accordance with specified virtual physical laws, at least partially in accordance with the particular measurement of the affected signals and/or states. Therefore, attributes being manifested may relate to, but nonetheless, be in addition to or instead of existing signal and/or state attributes prior to re-physicalization. Thus, in this non-limiting illustrative example, a spatial effect attributable at least partially to initial signal(s) and/or state(s) 410 has been re-physicalized onto virtual particles at locations different relative to initial signal(s) and/or state(s), resulting in a spatial contour effect in which gray scale shading inferentially conveys signal influence visually.

Example embodiments involving re-physicalization may also be employed, for example, in connection with embedded web browser-type environments. For example, a two-dimensional (2D) surface in a three-dimensional (3D) game environment on a computing device may comprise an active, functional web browser page. In an embodiment, web browser-type analytic visualizations may be embedded within a 3D scene within a virtual environment. For example, in an embodiment, signals and/or states may be re-physicalized by attaching a web page to the surface of one or more VPOs. In this manner, a dynamic web browser page may remain visible, but due at least in part to its attachment to one or more VPOs, a virtual web browser page may acquire virtual physical properties and follow virtual laws of motion and interaction.

In an embodiment, for example, a web page depicting measurement content of interest may be displayed via a browser object assigned virtual physical properties such that it floats to the top of a 3D stack of web pages and/or to the foreground in a 3D scene for a user to view as the highest priority web page. Thus, in this non-limiting illustration, a set of web pages are capable of moving around in 3D virtual space autonomously. Typical positional limitations of regular 2D web portals and/or browser tabs may not therefore be applicable such that position and/or other characteristics of a web page in a browser (e.g. size, transparency, highlighting, positional order, etc.) may be driven without a user necessarily having to arrange windows 'by hand' (e.g., manually) using conventional gestures and/or mouse actions. In yet another embodiment, for example, a user may direct two 3D objects in a virtual environment to come into contact where respective browser objects contain one or more web pages on a display so that contact may result in contextual parameters from one web session passing to the other. For example, browser objects, such as these, could share filters, authorization rights, and/or 'clone' content. In another example, web pages could be stacked one over another such that a page in a browser object displays a level in a hierarchy based at least in part on one (or more) parameters, such as height in a stack and/or proximity to neighboring browser objects. In this way a web browser page can have its content re-physicalized. Another example would be live video streams which could be autonomously organized in a similar manner. Of course, claimed subject matter is not limited in scope in these respects.

Figure 7:
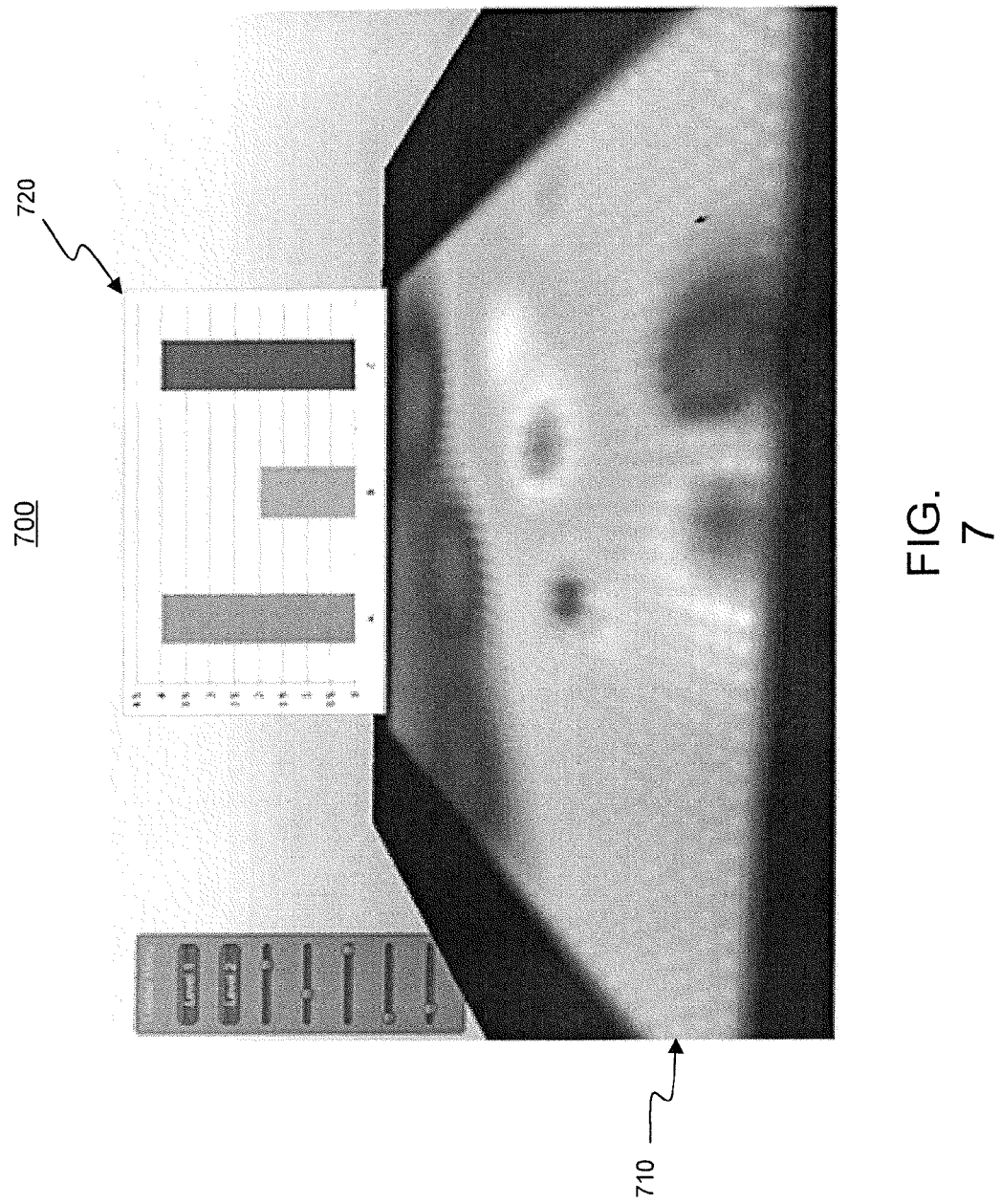
FIG. 7 is a re-physicalization illustrations using spatial contouring including a bar chart, according to an embodiment.

FIG. 7, showing gray scaling, much like before with FIG. 6, provides another illustration of an example of a spatial contouring visualization involving re-physicalization, here, including a bar chart 720, according to an embodiment. FIG. 7, for example, depicts example bar chart 720 embedded in 3D visualization 700 with a height of individual bars of bar graph 720 indicative of a count of a number of underlying points 410 that share a specified attribute and/or that have a content measurement value that falls within specified bins, or ranges, such as in a histogram, in an embodiment.

Figure 8:
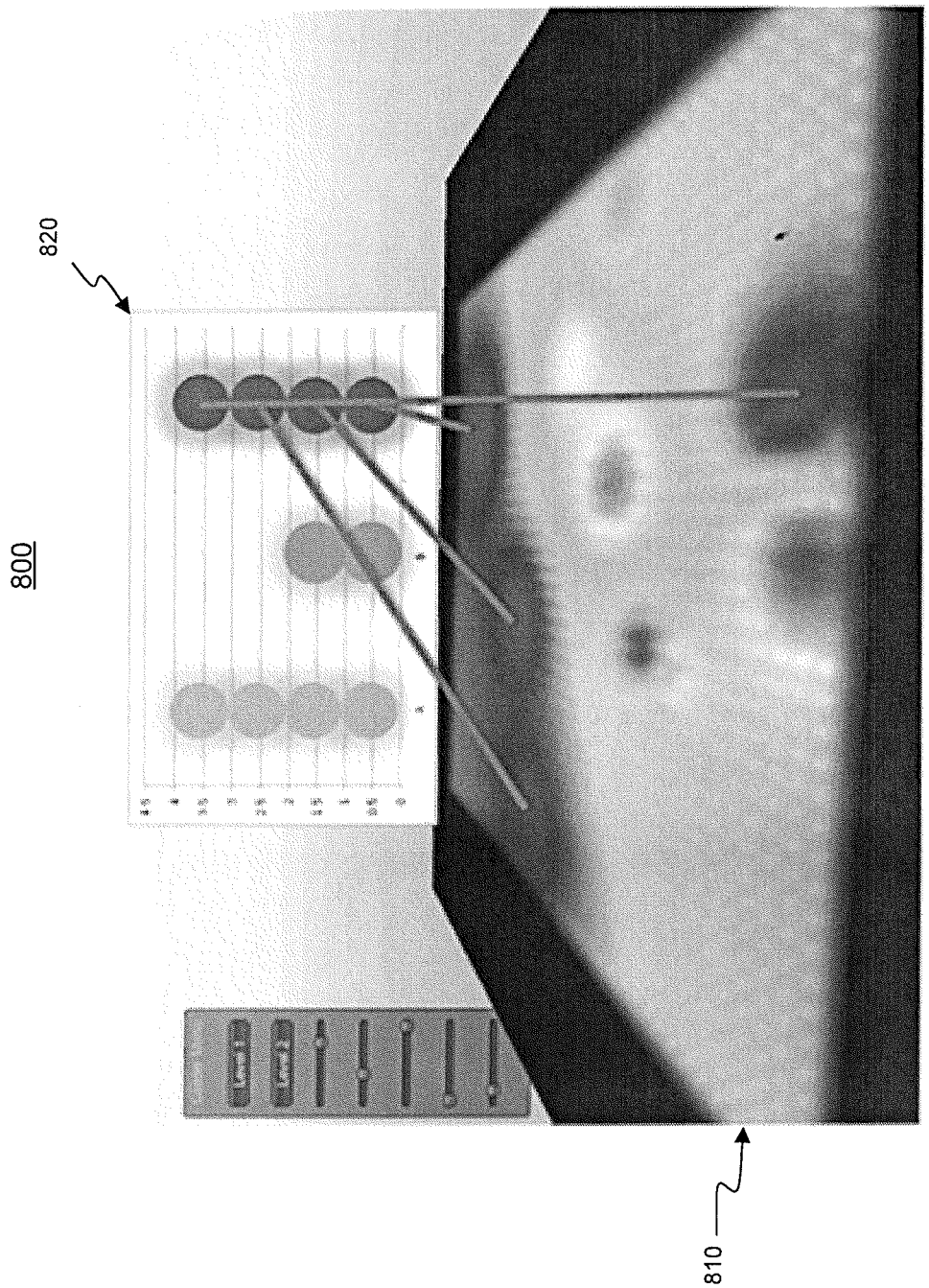
FIG. 8 is an additional re-physicalization illustration using spatial contouring including a bar chart, according to an embodiment.

Similarly, FIG. 8, again showing gray scaling, provides yet another illustration depicting an example spatial contouring visualization of re-physicalization, again, including a bar chart 820, according to an embodiment. FIG. 8 depicts example generation of a bar chart, such as bar chart 820, without user direction, here by now re-physicalizing underlying points 410 as VPOs and then grouping together into clusters of similar measurement values shown as circles in the bar chart. For example, particles could be encoded with a color such as "purple" or equivalently a darkest gray scaling, as shown here by spatial contouring in FIG. 8 and grouped together, as depicted by darkest gray scaling of bar chart 820. For examples shown in FIG. 8, lines are shown leading from encoded VPOs of grid 820 to an appropriate column in bar graph 820 to depict an animation "morphing" path from the centers of spatially distributed points of VPO grid 810 to a corresponding arrangement in bar chart 820. Although morphing paths are shown for a single category of VPO particle type, other embodiments may incorporate other categories of particle types. In this context, the terms morph, morphing and/or similar terms refer to a process of transformation, which may be gradual in some instances, from one form to another. Additionally, morphing paths may be depicted in other embodiments for any number of specified category types. Of course, claimed subject matter is not limited in scope to a particular illustration, such as FIG. 8.

As previously indicated, "morphing" may refer to a gradual transformation, which, in an embodiment, may include evolution between different embedded VPOs. For example, in an embodiment, a plurality of re-physicalized particles may exist at rest on a map plane. Additionally, there may be an arrangement in which particles may be partitioned into groups that may share one or more common properties and/or attributes. In an embodiment, groups of particles having common properties may "morph" into rectangular bars. A bar chart and a spatial map may represent different ways of looking at measurement content. A spatial map may highlight a spatial distribution of points representative of measurement content, and a bar chart may depict amounts of points in particular categories.

Generating a bar chart from particles may enable a visual connection to be made by a user. Particles may correspond to locations on the map. Alternatively, an assembly of points on a map may morph into an aggregate-style presentation, such as a bar chart. During morphing, features, such as shading, etc., of particles, may remain the same or may change to visually aid in user comprehension, for example. Again, claimed subject matter is not limited in scope in these respects.

Thus, embodiments may comprise game-related technology, for example, incorporating graphics card and/or processor, and may incorporate game code to simulate laws of motion (e.g., implement virtual physical laws) in four-dimensional space-time. Rather than being used for entertainment, a game-type engine may be utilized to evolve one or more VPOs, as described above, for example.

In an embodiment, a game type engine, such as may be found at www.unity3d.com, for example, may be utilized to generate a visualization system. In an embodiment, a particle system having typical options as may be used in a game for simulating liquids and/or other properties, for example, may be generated. In an embodiment, virtual physical laws may include initial particle velocities and/or relatively simple simulation effects, such as making particles appear to be subject to gravity in a virtual environment, for example. Additional code may be developed to extend particle behavior to take on more complex attributes of one or more VPOs, described above, in an embodiment. Advantages of using a game type environment to implement a virtual environment may include an ability to deploy similar functionality across a range of device types, including personal computers of various operating systems and/or gaming platforms from various vendors, for example.

Some game type environments may allow objects to be generated as rigid bodies and/or may obey a set of virtual physical laws, including, as examples, gravity and/or collision related behavior, in an embodiment. As mentioned, additional code may be developed to implement more complex VPO attributes and/or more complex virtual physical laws than may otherwise not be available. In an embodiment, for example, some aspects of a virtual environment through visualization may be implemented using one or more game type environments; other aspects may be implemented via customization. Also, in an embodiment, for example, a virtual environment that is able to be visualized may be implemented using WebGL, a Javascript application programming interface for 3D graphical rendering, and/or coding may be accomplished using Javascript, for example. In another embodiment, for example, OpenGL and/or DirectX libraries may be utilized in addition to native code. Likewise, a virtual environment may be implemented on a computing device to be substantially compliant with and/or substantially compatible with any now known and/or to be developed versions of the foregoing. However, claimed subject matter is not limited in scope in these respects.

Figure 9:
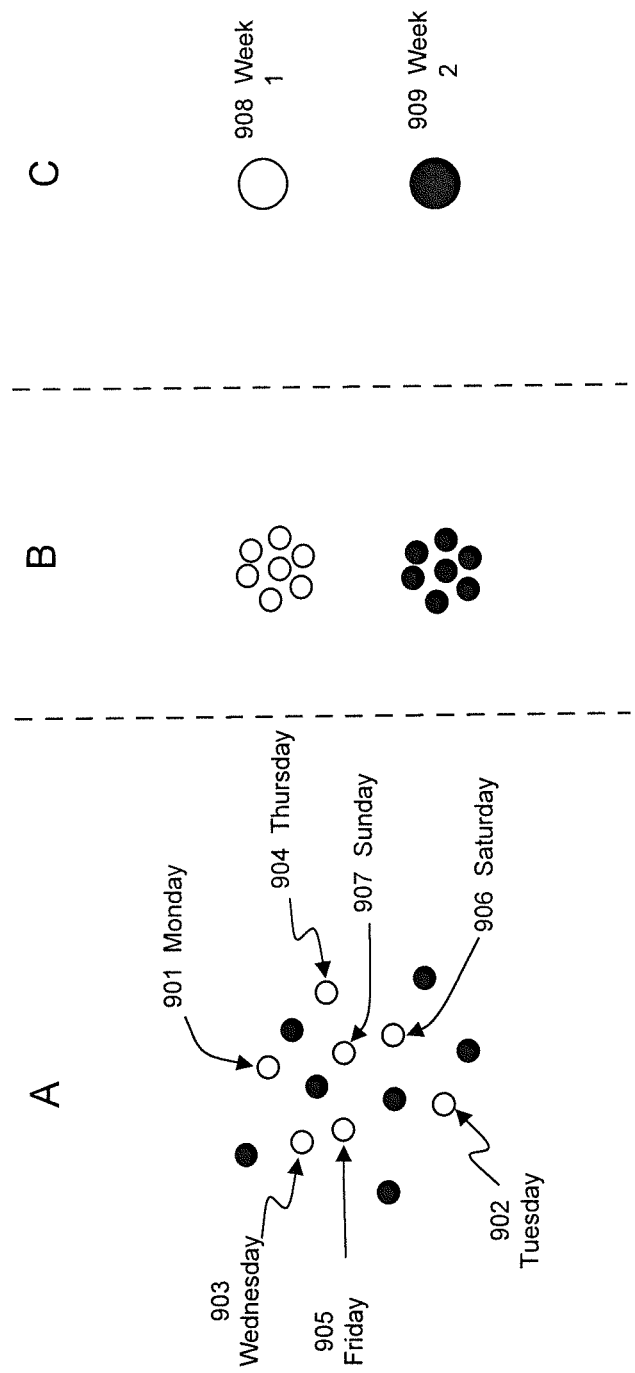
FIG. 9 is a re-physicalization illustration of an example process for content aggregation and/or selective retention, according to an embodiment.

FIG. 9 is an illustration of an example process for aggregation and/or retention, such as of stored states, as an example of re-physicalization, according to an embodiment. In an embodiment, such as, for example, discussed above in connection with FIG. 2, one or more VPOs in an embodiment, as previously described are described, may be generated by being "injected" into a virtual environment, such as, for example, virtual environment 230. In one example embodiment, management of content aging and/or content aggregation may be accomplished via re-physicalization in a manner that may be viewed as "more intuitive" to an end-user than typical approaches and/or with less programming overhead.)

Typically, content management and/or retention may be instituted for a variety of possible reasons. Likewise, in an embodiment, it may be expected for one or more VPOs to exist for a specified period of time, as previously discussed. This may follow from virtual physical laws, for example. As one example use, a user may seek pre-existing relevant and/or useful content, but prefer not to wade through a large amount of pre-existing content, as an example. Thus, for the example of FIG. 9, sequential periods of time A, B, and C are depicted. In time period A, recently-added VPOs 901-907, perhaps representing VPOs related to ICOs generated for individual days of the week, for example, may be presented with a greater degree of detail than presentation of less recent VPOs depicted in time periods B and C. For example, time period A depicts a greater amount of detail for individual VPOs, time period B depicts a reduced amount of detail, and time period C presents an aggregated version of the VPOs, in an embodiment. In this manner, a user may more readily review VPO activity for recently-generated VPOs than otherwise.

Figure 10:
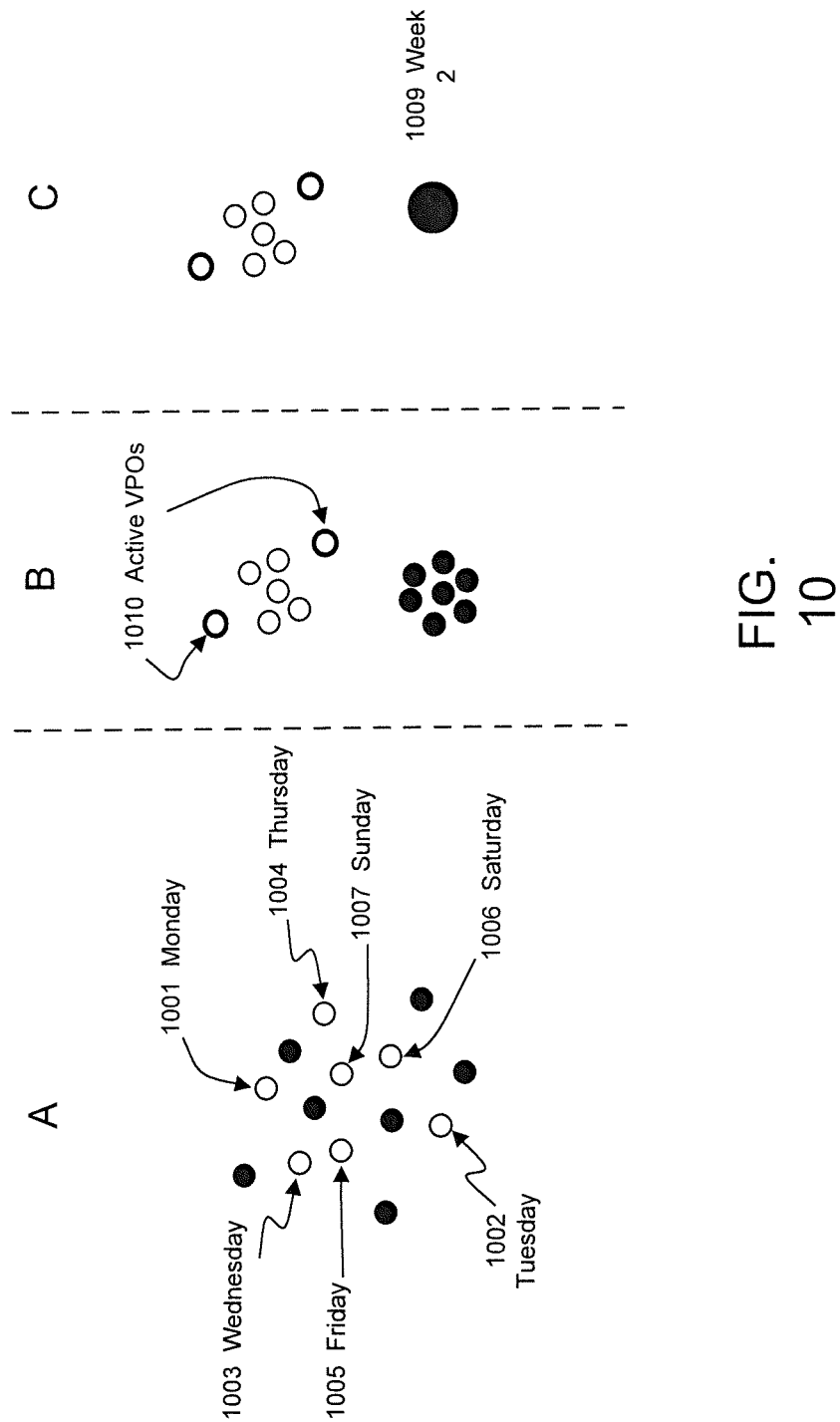
FIG. 10 is another re-physicalization illustration of an example process for content aggregation and/or selective retention, according to an embodiment.

Similarly, FIG. 10 provides another illustration. Similar to the example of FIG. 9, the example of FIG. 10 generally depicts a reduced amount of detail for less-recently generated VPOs. However, the example of FIG. 10 includes maintaining a greater degree of detail for active VPOs, regardless of elapsed time period. For non-active VPOs, in an embodiment, a reduced amount of detail is shown for less-recent VPOs, until an aggregation of VPOs occurs at time period C, for example. Content degradation may be implemented as a coalescing of particles according to one or more virtual laws. Of course, claimed subject matter is not limited in scope in these respects.

As previously described, re-physicalization in this particular context, more specifically, refers to assigning additional or replacement physical attributes to affected signal(s) and/or state(s) in which those attributes being assigned relate to physical manifestations capable of being emulated, such as in accordance with specified virtual physical laws, at least partially in accordance with the particular measurement of the affected signals and/or states. Therefore, attributes being manifested may relate to, but nonetheless, be in addition to or instead of existing signal and/or state attributes prior to re-physicalization. Thus, in this non-limiting example, content may take on virtual physical properties of a system of particles in which particles have virtual physical properties that aid in managing content and/or managing content retention, such as a limited period of existence, merging with other particles, etc.

Figure 11:
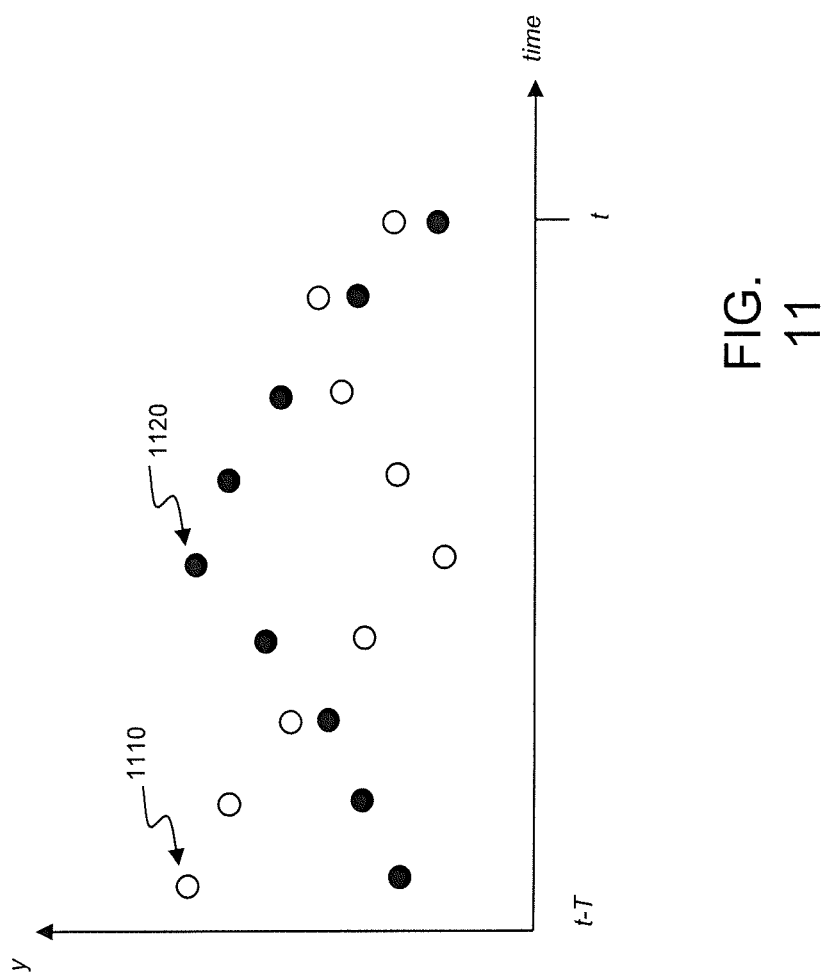
FIG. 11 is an illustration of an example time-series.

FIG. 11 is an illustration of an example time-series, according to an embodiment. The example time-series depicted in FIG. 11 may depict a typical approach to a time-series display. For example, the time-series display of FIG. 11 depicts example values at individual points. Points may optionally be joined using lines or other interpolation methods, for example, in an embodiment. Additionally, content belonging to multiple time-series points may be depicted using different point types such as, for example, points 1110 and/or points 1120. As time advances, such as from t-T to t as depicted in FIG. 11, and as points are added, the display may be re-drawn to show added point locations, and older points that are outside a specified time window may be removed. Adding and removing points, and re-drawing as points are added and/or removed, however, may be computationally burdensome for a processing unit, such as a CPU. For example, overhead may be incurred by a processor due at least in part to re-calculating and/or redrawing a display as points are added and/or removed. Thus, for example, refresh of the display may be restricted to every second due at least in part to performance limitations for a relatively large number of points to calculate and/or draw, for example. Additionally, recalculating and/or redrawing a display to remove and/or add points may produce "apparent" jumps in time for the points depicted (e.g., movement to the next position), thereby potentially resulting in a discontinuous apparent flow of points visually. Challenges, such as those presented by these examples, may be undesirable.

Figure 12:
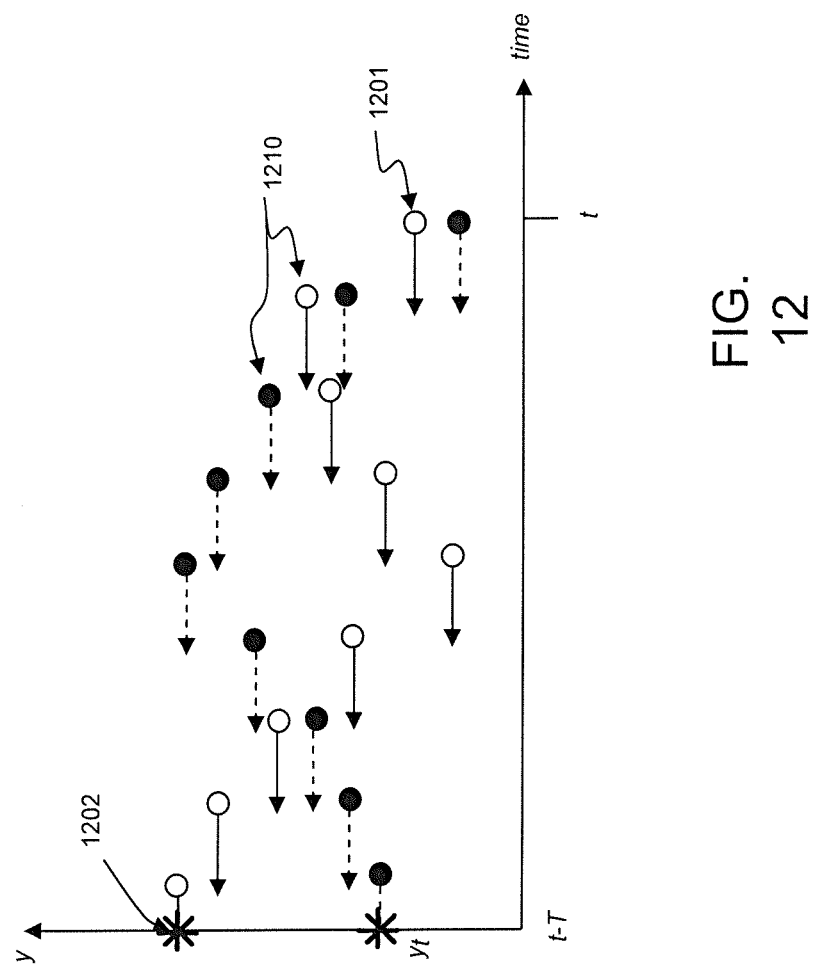
FIG. 12 is a re-physicalization illustration of an example time-series, according to an embodiment.

In contrast, re-physicalization may at least partially address various visual issues, such as those discussed and/or others. For example, FIG. 12 is an illustration of an example time-series for an example of re-physicalization, according to an embodiment. In an embodiment, a time series may be represented, for example, using a particle system in a virtual environment. For example, calculations related to particle movement, such as particles 1210, along a time line may be performed by a graphics processor, in an embodiment. In an embodiment, individual particles 1210 may comprise one or more VPOs. For the example of FIG. 12, at a most recent time "t," a particle 1201 may be injected into a particle system such as depicted in FIG. 12, with specified virtual physical properties, in an embodiment. Example virtual physical properties for a particle may include, but are not limited to, color, shape, size, transparency, etc. A particle may also be assigned an initial virtual velocity "v" and a particle lifetime "$T_{particle}$" after which a virtual particle may be "destroyed" or otherwise cease, for example.

For the example depicted in FIG. 12, particles, such as particle 1201, may be injected on the right hand side and may move at a constant velocity "v" until reaching a vertical axis where, for an example embodiment, particle lifetime expires, as depicted at 1202. Such an approach, although merely a simple illustration of re-physicalization, may have a variety of advantages. For example, particle dynamics calculations may be performed using a graphics processor to run at a high frame rate, thereby potentially displaying a smoother motion of particles from right to left than might otherwise be depicted using other approaches. This may be particularly desirable for situations where millions of particles may be involved. Additionally, a central processing unit, in an embodiment, may communicate with a graphics card to inject a particle. Thus, a graphics processor may be able to maintain a time-series display without significant amounts of regeneration, thereby reducing potential burden of both processors, for example.

Figure 13:
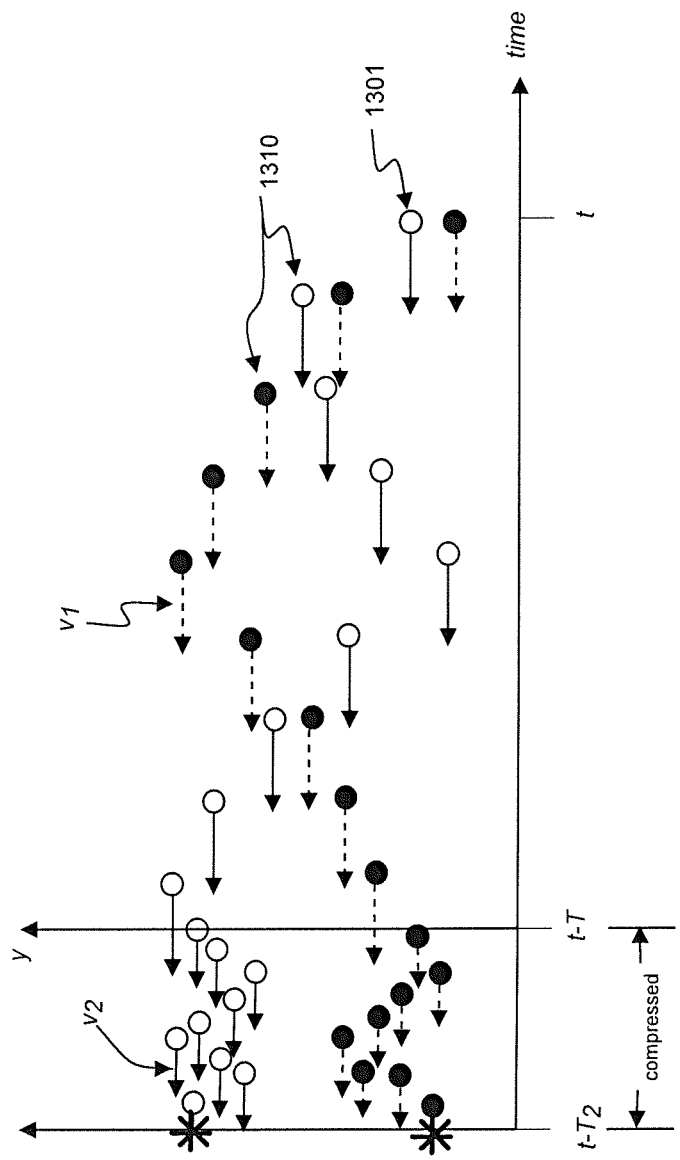
FIG. 13 is another re-physicalization illustration of an example time-series, with an example time compression zone, according to an embodiment.

FIG. 13 is another re-physicalization illustration of a time-series, here, with an example time compression zone, according to an embodiment. The example depicted in FIG. 13 is similar in respects to the example depicted in FIG. 12. However, FIG. 13 depicts a particle system that includes a region of time compression in this example. Assume that the time from t to t-T is the same as the time from t-T to $t-T_2$. Thus, time compression may be accomplished, in an embodiment, by slowing down particles, such as 1310 or 1301, as they cross a threshold time "t-T," in this example In one embodiment, compression may take the form of a step function decrease in particle velocity, for example. In another embodiment, a nonlinear decrease in particle velocity may be utilized to create a logarithmic time scale. For example, a time scale may graduate from seconds, to days, to weeks, and to years on a particular display, for example, in an embodiment. Of course, claimed subject matter is not limited in these respects. For the embodiment depicted in FIG. 13, however, after particles cross vertical line at "t-T," velocity decreases. Thus, in this non-limiting example, using virtual physical principles in a virtual environment, time, for example, may be re-physicalized, as shown, as an aid to visualization and/or user comprehension. In another embodiment, a similar effect may be achieved using 3D perspective whereby the left hand side of FIG. 13 is tilted away from an observer resulting in a change in visual perspective affecting apparent time compression (e.g., of older points in the distance).

Figure 14:
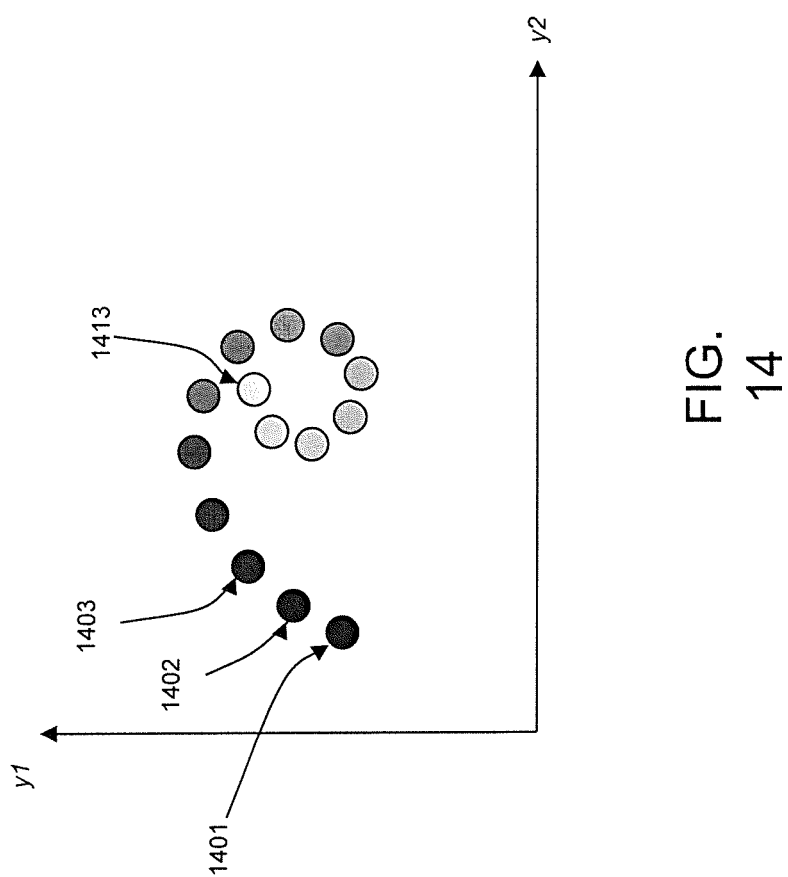
FIG. 14 is a re-physicalization illustration of an example phase space, according to an embodiment.

FIG. 14 is an example visualization of a phase space approach for another illustration of re-physicalization, according to an embodiment. A phase space visualization of a time-series may, for example, illustrate y1 versus y2 in which time is parametric, rather than employing rectangular coordinate values, for example, for y1 and y2 versus time. In an example embodiment, a particle system may be utilized to generate a phase space visualization, such as depicted in FIG. 14. For the example depicted in FIG. 14, particles of a system may appear to be stationary. However, in an embodiment, individual particles may have properties that evolve over time, including complete decay, for example.

For example, one or more particles may be injected over time. FIG. 14 provides a parametric phase space representation of coordinates $(y_1, y_2)$ at time t, with a particle parameter alpha affecting transparency. Thus, for this example, particles "fade out" by time T. For example, particles 1401, 1402, and/or 1403 may represent recently injected particles, and particle 1413 may represent a particle fading out. Thus, in this non-limiting example, using virtual physical principles in a virtual environment, time, for example, may be parameterized and also re-physicalized as particle transparency as an aid to visualization and/or user comprehension.

Figure 15:
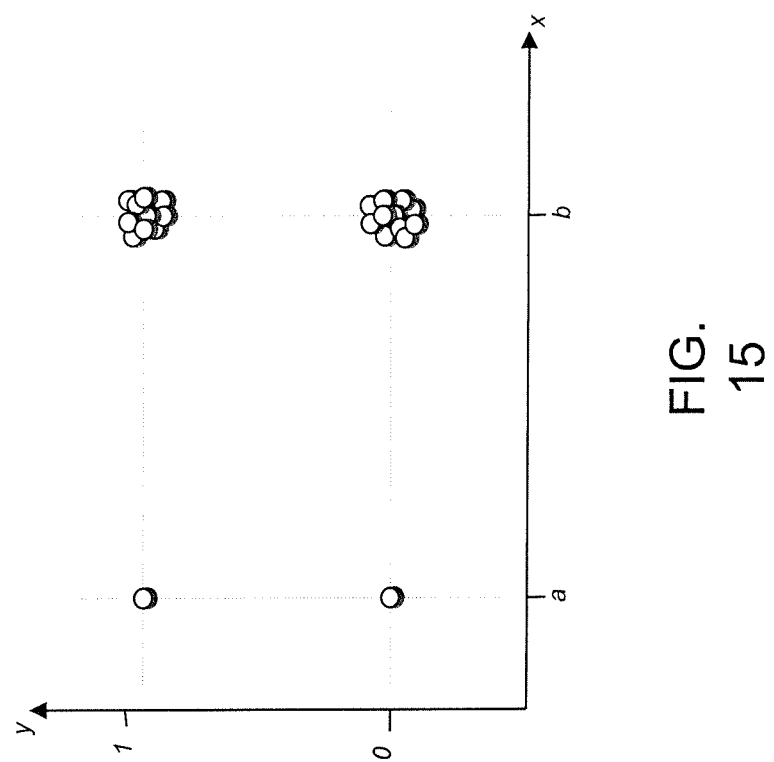
FIG. 15 is a re-physicalization illustration of an example using jitter, according to an embodiment.

FIG. 15 is another re-physicalization illustration, here, using jitter, according to an embodiment. For the example embodiment depicted at FIG. 15, a particle may be assigned one of two possible "y" values. For example, injected particles may be assigned either a "y" value of 0 or 1, shown by points (a, 0) and (a, 1). As a simple example, this might be an evaluation of whether a two-sided coin is fair. Similarly, a six-sided die may be evaluated to make sure it is not loaded. Of course, these are simplified, non-limiting illustrations. However, in the illustrative example mentioned above, if displayed, multiple particles may simply stack one on top of the other, and a user may not be able to discern a single particle from multiple particles, as shown by points (a, 0) and (a, 1).

However, an amount of "jitter" may be added (e.g., using superposition of signal values) so that multiple particles do not stack one on top of the other. For example, at points (b, 0) and (b, 1), multiple particles are rendered visible at least in part due to jitter (e.g., addition of random or approximately random noise). Returning to the coin example, a coin landing on "heads" and on "tails" may result in a view, such as depicted at locations (a,0) and (a,1), in which individual occurrences of "heads" and "tails" perfectly align one on top of another. However, by adding jitter to VPOs representing individual coin flips, separate coin flips may be rendered more visible, such as depicted at points (b, 0) and (b, 1). Thus, for example, in judging whether a coin in loaded, for example, a comparison of groupings of multiple particles may provide a visual representation. That is, the grouping should be relatively equal in number (and size) for a coin that is fair. Of course, claimed subject matter is not limited in scope to these illustrations. Thus, in this non-limiting example, using virtual physical principles in a virtual environment, for example, re-physicalization may include employing jitter to produce a visualization to aid in human comprehension.

FIG. 16 is a re-physicalization illustration providing an example 2D rendering and an example volumetric (3D) rendering, according to an embodiment. For a variety of possible situation, including embodiments described herein, two-dimensional depictions of re-physicalization may be provided. However, claimed subject matter is not limited in scope to two-dimensional re-physicalization. For example, FIG. 16 depicts a 2D representation 1620, and also depicts a 3D representation 1630. An embodiment in which 3D representations may be utilized may include, for example, underground geological surveying or a point cloud where the points comprise re-physicalized VPOs. Another example may comprise magnetic resonance imaging. Of course, claimed subject matter is not limited in this respect.

As mentioned previously, for example in connection with FIG. 2, an interface, such as 260, may comprise physical sensors with which a user may interact and/or that may measure and/or track characteristics of a user. For example, a camera may be utilized to track user movements, and/or a user may be monitored using bio-sensors for biological indicia, such as heart rate, respiration, temperature, etc. Additionally, devices for measuring brainwaves and/or emotional state may be utilized to generate sensor measurements and/or ICOs.

In an embodiment, bio-sensing may perhaps enable users to interact with a virtual environment, such as 230, via human brain related measurements. For example, as scientists and/or doctors map neuron activity, which is capable of being measured, in an embodiment, a user might affect one or more VPOs in a virtual environment via neuron related activity and/or neurotransmitter related activity being sensed, for example, although claimed subject matter is not limited in scope in this respect. One might imagine that particular thoughts might result in particular brain activity that may be measured and re-physicalized. Thus, a mechanism to at least partially affect one or more VPOs through particular thoughts might be possible.

In another embodiment, supraliminal and/or subliminal sensing modes may be implemented. In an embodiment, an emotional state of a user may be detected and one or more characteristics within a virtual environment may be adjusted. Depending at least in part on the particular situation, one might imagine a virtual environment to maintain a desired emotional state, to generate virtual physical objects to adjust an emotional state, and/or as a result of a detected emotional state, restricting particular user interactions, as a few non-limiting examples. Additionally, availability of biometric measurement content may enable biometric authentication implementations, in an embodiment. Thus, in these non-limiting examples, using virtual physical principles in a virtual environment, for example, re-physicalization may include permitting sensor measurements associated with human brain activity to affect aspects of a virtual environment presented to a user.

Figure 17:
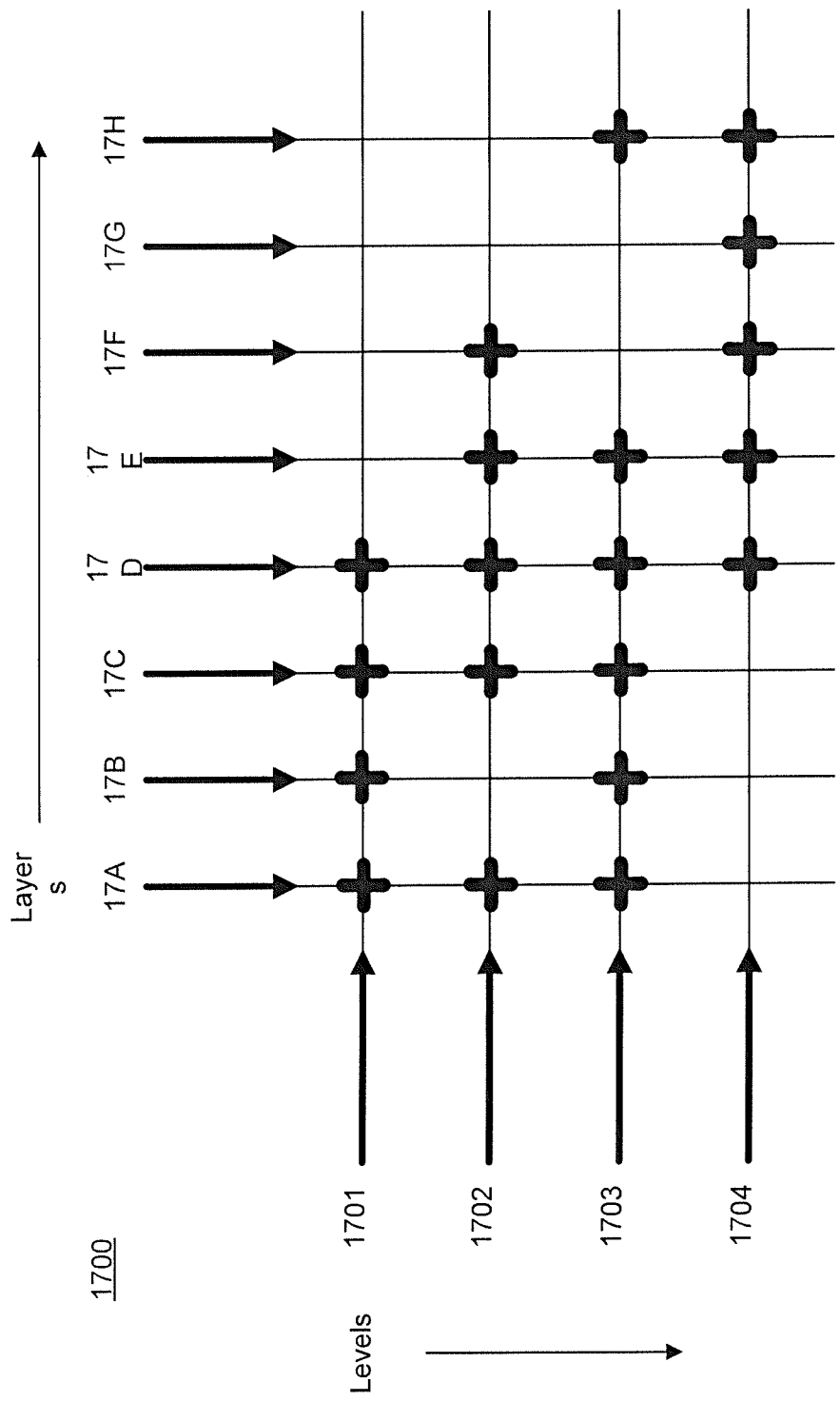
FIG. 17 is a re-physicalization illustration of an example layer/level structure, according to an embodiment.

FIG. 17 is a re-physicalization illustration that includes an example layer and level structure 1700 according to an embodiment. Embodiments in accordance with claimed subject matter may, for example, employ a "level" in a virtual environment analogous to levels employed in some computer video games. Also, in an embodiment, a "layer" may also be employed in a virtual environment, for example, such as depicted in FIG. 17, as an example.

In an embodiment, a level, such as levels 1701 through 1704, may comprise a hierarchical arrangement such that a user may "drill down" to deeper levels of a virtual environment. One non-limiting example may be to represent the interior of a virtual physical building as a separate level or the interior of a piece of equipment. In another embodiment, a level may also comprise different spatial areas in a horizontal spatial representation at a higher resolution of detail.

In gaming, layers may be employed, such that objects may be assigned to layers, and different layers may be turned 'on' and 'off.' In FIG. 17, for example, layers 17A through 17H are depicted, although claimed subject matter is not limited in scope in these respects. Additionally, in an embodiment, within individual levels, there may exist layers that may be turned on and off. For example, in an embodiment, one or more VPOs may be assigned to one or more specific layers, and these specific layers may be turned on or off. A layer may comprise any arrangement of one or more VPOs in a virtual environment, by way of non-limiting example, dashboards, embedded web browser sessions, etc.

In an example embodiment, level 1701 may comprise a wide area view of an electric grid in a virtual environment. Likewise, a layer that may be referred to as "transformers" may have transformers within a wide area view which may become visible if that layer is turned on. Further, in an embodiment, another layer may be referred to as "temperature." For the wide area of level 1701, for example, a temperature layer may show environmental temperature over the wide area if turned on.

Additionally, a user may move a VPO, such as a camera, to focus on a specific transformer and a user may enter another level, such as 1702. Level 1702 may, for example, comprise a single transformer and may show an internal view of the transformer, along with metrics and charts relating to performance of that transformer, in an embodiment. Within that example layer, the user may also turn on the layer referred to as temperature, which may highlight the temperature of the individual sub-systems inside the transformer, for example.

A variety of types of systems may be emulated through re-physicalization, again, with a result that visualization may be an aid to human understanding. Examples, discussed quickly below, include operations and/or system planning for an electrical grid network, an oil and/or gas network, a water utility network, a transportation system and an entertainment venue.

As mentioned previously, one or more embodiments may comprise an example system for visualization of an electrical grid network in a virtual environment, such as, for example, for network operations and/or planning. For example, an example embodiment such as depicted in FIG. 2, may be utilized to generate and/or display a virtual environment, such as 230, representing an electrical energy transmission and/or distribution network. In an embodiment, an example electrical grid network may be implemented, at least in part, with a game engine, as previously discussed, and/or within a web browser executed at least in part by a processor of a computing device, such as depicted, for example, in FIG. 18, and as discussed below.

Example types of one or more virtual physical objects (VPOs) that may be utilized in a virtual environment to implement an example electrical grid network may include one or more VPOs that represent supply, demand, transmission, and/or distribution of electrical energy, in an embodiment. Additional example VPO types may include, for example, one or more VPOs that may show energy storage for pumped storage systems and/or batteries. Also, in an embodiment, streams of VPOs may be animated, such as from energy sources to energy sinks, to represent flow of energy in a virtual environment. In an embodiment, one or more VPOs may comprise re-physicalized ICOs to provide visualization of electrical transmission characteristics such as, for example, power, current, voltage, phase angle, and/or frequency. Additional VPOs may be employed to capture voltage instability and/or oscillating modes of an energy grid. Further, in an embodiment, virtual physical laws associated with one or more VPOs may include one or more conservation laws. For example, energy balance within a network may be monitored, such that if a physical energy imbalance is detected, the imbalance may be depicted in some fashion within a visualization, such as 230. For example, in an embodiment, a violation of a virtual energy conservation law may be depicted by highlighting an area.

Also, in an embodiment, additional VPO types that may be implemented include VPOs to represent electric "smart" meters that may be installed in one or more residential homes and/or businesses. VPOs may have one or more virtual physical properties for a state of a building in terms of energy use, occupancy, temperature, humidity, etc. for example. Further VPO types may represent distributed energy generation sources, such as, for example, rooftop photovoltaic generation, for example. Additional VPO types may represent an electrical vehicle, the vehicle's charge state, and/or a rate at which the vehicle is draining energy from an electrical grid and/or supplying energy to a grid, in an embodiment.

In another embodiment, embedded particles, such as particles 510 depicted in FIG. 5 and FIG. 6, may be utilized to highlight spatial patterns across a wide geographical region of an electrical grid system. A user, such as user 270, may interact with an example electrical grid in a virtual environment, such as by way of one or more of interfaces, such as 260, to adjust distance functions and therefore highlight patterns, for example. Additionally, VPO types comprising weather related environmental conditions may be implemented, in an embodiment. Weather related environmental conditions may include, for example, rainfall, wind, humidity, and/or solar irradiance.

Further, VPOs may be utilized to capture risk in a virtual environment. Example elements of risk may be depicted in terms of probability of failure of a physical system component and/or asset on the grid, and/or may be characterized in terms of impact of system or component failure in financial, human, and/or environmental terms, in an embodiment. Additionally, VPOs may have virtual physical attributes related to monitoring conditions of one or more physical system components and/or assets, in an embodiment. Still further VPOs may represent location and/or state of physical system resources, such as, for example, repair and/or maintenance crews.

Also, in an embodiment, a user, such as user 270, may interactively perform tasks such as, for example: schedule and/or dispatch field service crews; set beneficial energy generation levels; resource usage during restoration of energy delivery service following an outage, such as due to a storm, for example; demand response, such as if a load may be turned off to match available energy generation levels; and/or perform energy dispatch operations in an environment including volatile renewable energy generation sources, such as wind farms and/or solar, for example.

Additionally, one or more embodiments may comprise an example visualization in a virtual environment of an oil and/or gas network, such as, for example, for network operations and/or planning. For example, an example embodiment, again, such as depicted in FIG. 2 may be utilized to generate and/or display a virtual environment, such as 230, representing an oil and/or gas transmission and/or distribution network. In an embodiment, one or more VPOs may represent supply, demand, transmission, storage and/or distribution of gas, for example. Also, in an embodiment, streams of VPOs may be animated from sources to sinks to represent flow of physical gas. VPOs may depict flow rate, density, velocity, pressure and/or temperature of gas, in an embodiment. Also, in an embodiment, one or more VPOs may be re-physicalized as "super-particles" of gas, rather than as individual gas molecules that follow the same laws of motion at an aggregate level. Further, similar to the energy grid example described above, VPOs may behave in accordance with virtual laws related to mass and/or momentum balance, such that a physical violation of these virtual physical laws captured by sensor measurements may result in a highlighting of an area of visualization.

Also, similar to embodiments mentioned above in connection with an energy grid system, one or more VPOs may represent gas "smart" meters that may be installed in residential homes and/or businesses. In an embodiment, smart meter VPOs may represent a state of building in terms of energy use, occupancy, temperature and/or humidity. In another embodiment, embedded particles, such as embedding particles 510 depicted in FIG. 5 and FIG. 6, may be utilized to highlight spatial patterns across a wide geographical region of an example gas and/or oil transmission and/or distribution system. A user, such as user 270, may interact with an example gas and/or oil pipeline network in a virtual environment, such as by way of one or more of interfaces, such as 260, to adjust distance functions and, therefore, highlight patterns related to the example gas and/or oil network, for example. Additionally, VPO types related to weather related environmental conditions may be implemented, in an embodiment, and may include, for example, rainfall, wind, humidity, and/or solar irradiance.

Additionally, VPOs may be utilized to depict elements of risk in an example gas and/or oil network. These may be characterized in terms of probability of failure of a system component and/or asset, and/or impact in financial, human, and/or environmental terms, in an embodiment. Additionally, VPOs in an example gas and/or oil network may be assigned virtual physical attributes related to monitoring conditions of one or more system components and/or assets, in an embodiment. In an embodiment, a user, such as user 270, may perform tasks such as, for example, scheduling and/or dispatching field service crews and/or gas storage and/or compression. Of course, claimed subject matter is not limited in scope in these respects.

Other embodiments may include water utility network operations and/or planning implemented in a virtual environment. For example, in an embodiment, a water transmission and/or distribution network may be represented. As with other embodiments, an example water transmission and/or distribution network may be implemented, such as using a game engine and/or in a web browser. In an embodiment, one or more VPOs may represent supply, demand, transmission, and/or distribution of water. Other VPOs may represent storage of water in reservoirs. In an example, streams of VPOs may be animated to represent a flow of water. VPOs may depict flow characteristics, such as flow rate and/or depth. Other VPOs may relate to pollution and/or contamination of water. One or more VPOs may be re-physicalized as "super-particles" of water representing multiple, rather than individual, water molecules, in an embodiment. Also, in an embodiment, virtual physical laws assigned to one or more VPOs may include conservation laws, such as, for example, flow balances. In an embodiment, a violation of virtual physical flow balance laws may be detected and highlighted.

Still other VPOs may represent water "smart" meters, such as installed in residential homes and/or businesses. VPOs may depict a state of one or more buildings in terms of energy use, occupancy, etc. in an embodiment. Other VPOs may represent a presence of distributed water storage, for example. Additional VPOs may represent presence of a water tank, current water level, rate at which water is consumed and/or supplied, etc. in an embodiment. Still other VPOs may represent location and/or state of resources, such as repair and maintenance crews. Further, users, such as user 270, may interactively perform tasks, such as, for example, setting pumping levels to manage build-up of water, and/or reducing impact of contamination by sewage, in an embodiment. Other tasks may include utilizing resources after an outage due to a storm to restore service to customers, and/or assessing demand response, such as in situations wherein distribution may be turned off and/or reduced to match available supplies.

Additional embodiments may include a logistics and/or transportation network, for example. In an embodiment, one or more VPOs depicted may represent supply, demand, and movement of vehicles, rail cars, airplanes containing freight and/or passengers, for example. Other VPOs may depict temporary storage of cargo in hubs and/or warehouses, in an embodiment. Also, in an embodiment, streams of VPOs may be animated to represent delivery of freight from sources to sinks by vehicles such as planes, trucks, rail cars, boats etc. Additionally, in an embodiment, VPOs may depict continuous flow characteristics in addition to discrete entities. Additionally VPOs that result in service level violation and/or congestion could be highlighted for example. Further, one or more VPOs may comprise "super-particles" representing aggregated freight packages rather than individual packages. Still other VPOs may represent customers in residential homes and/or businesses, to reflect a state related to package/freight sending and/or receiving, in an embodiment. Additional VPOs may depict vehicles used for transportation and/or to depict quantities, such as utilization percentage, operational costs, and/or average velocity, for example. In an embodiment, users may interactively perform tasks, such as scheduling and/or dispatch of vehicles and/or crew, network design, and/or hub location determination, for example.

Another embodiment may represent an example entertainment venue, such as a theme park, cruise ship, and/or concert venue, to name just a few examples. In an embodiment, one or more VPOs may represent arrivals, departures, paths taken, places visited within the venue. Other VPOs may represent queuing of guests in wait lines, in an embodiment. In an embodiment, one or more VPOs may depict flow characteristics, such as service level violation, pedestrian congestion, excessive wait times, and so forth, for example. Also, in an embodiment, one or more VPOs may comprise "super-particles" representing aggregated groups of guests, such as families, for example. Still other VPOs may represent venue patrons in residential homes and/or businesses, and/or may represent venue patrons in terms of departure, return and transit to the venue, for example. Additional VPOs may be utilized to depict vehicles used for transportation, and/or may capture quantities such as utilization percentage, operational costs, and/or average velocity, to name just a few examples. Also, in an embodiment, one or more VPOs may represent mobile devices of patrons and/or respective states of the mobile devices, for example. Additionally, in an embodiment, users may interactively perform tasks such as adjusting incentives for patrons within a venue to perform pedestrian traffic engineering, utilization of resources, reducing costs related to venue transportation systems, etc. Of course, claimed subject matter is not limited in scope in these respects.

Figure 18:
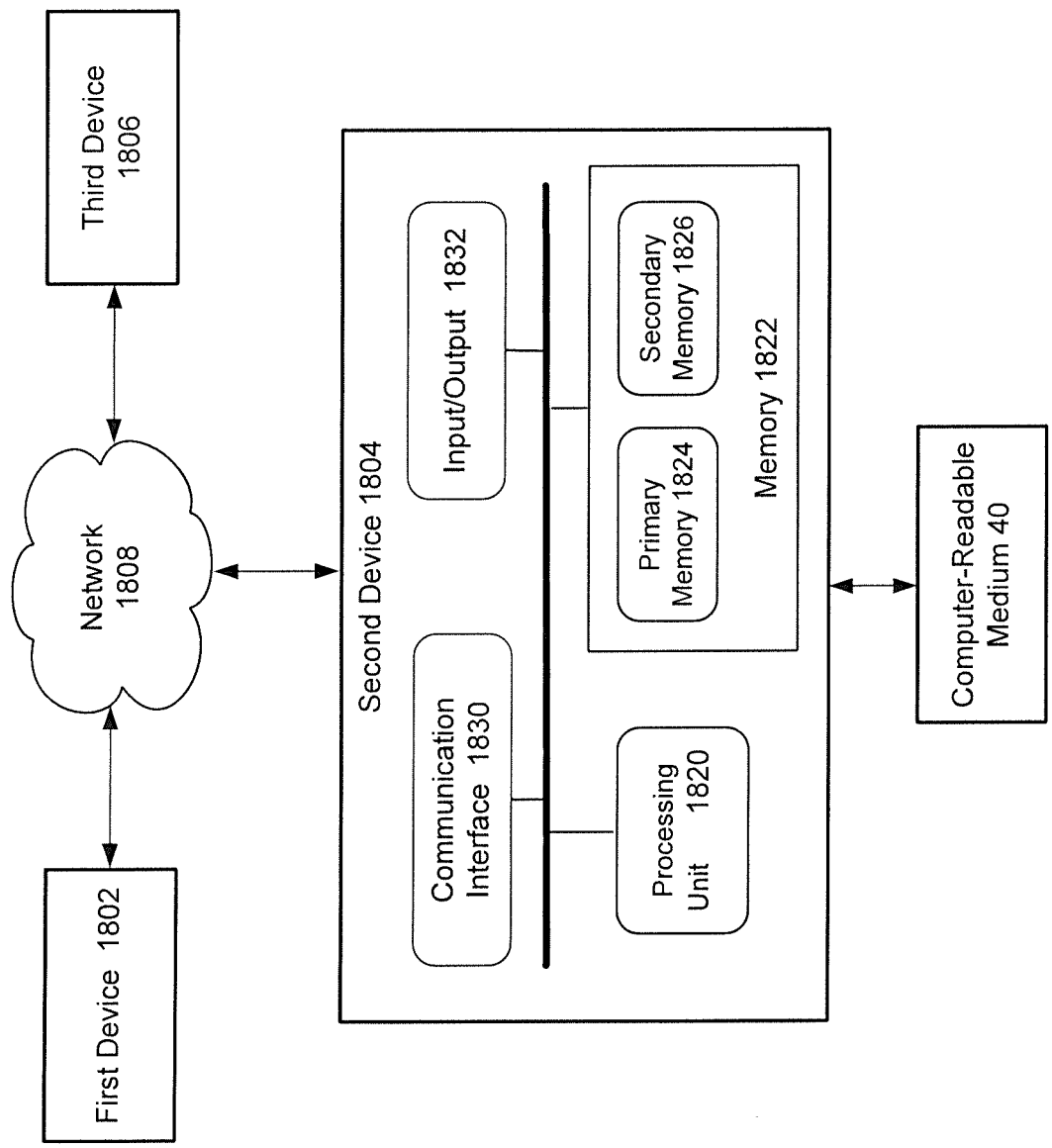
FIG. 18 is a schematic diagram illustrating an example computing device in accordance with an embodiment.

For purposes of illustration, FIG. 18 is an illustration of an embodiment of a system 1800 that may be employed in a client-server type interaction, such as described infra. in connection with rendering a GUI via a device, such as a network device and/or a computing device, for example. In FIG. 18, computing device 1802 ('first device' in figure) may interface with client 1804 ('second device' in figure), which may comprise features of a client computing device, for example. Communications interface 1830, processor (e.g., processing unit) 1820, and memory 1822, which may comprise primary memory 1824 and secondary memory 1826, may communicate by way of a communication bus, for example. In FIG. 18, client computing device 1802 may represent one or more sources of analog, uncompressed digital, lossless compressed digital, and/or lossy compressed digital formats for content of various types, such as video, imaging, text, audio, etc. in the form physical states and/or signals, for example. Client computing device 1802 may communicate with computing device 1804 by way of a connection, such as an internet connection, via network 1808, for example. Although computing device 1804 of FIG. 18 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 1820 may be representative of one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors, programmable logic devices, field programmable gate arrays, the like, or any combination thereof. In implementations, processor 1820 may perform signal processing to manipulate signals and/or states, to construct signals and/or states, etc., for example.

Memory 1822 may be representative of any storage mechanism. Memory 1820 may comprise, for example, primary memory 1822 and secondary memory 1826, additional memory circuits, mechanisms, or combinations thereof may be used. Memory 1820 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 1820 may be utilized to store a program. Memory 180 may also comprise a memory controller for accessing computer readable-medium 1840 that may carry and/or make accessible content, which may include code, and/or instructions, for example, executable by processor 1820 and/or some other unit, such as a controller and/or processor, capable of executing instructions, for example.

Under direction of processor 1820, memory, such as memory cells storing physical states, representing, for example, a program, may be executed by processor 1820 and generated signals may be transmitted via the Internet, for example. Processor 1820 may also receive digitally-encoded signals from client computing device 1802.

Network 1808 may comprise one or more network communication links, processes, services, applications and/or resources to support exchanging communication signals between a client computing device, such as 1802, and computing device 1806 ('third device' in figure), which may, for example, comprise one or more servers (not shown). By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations)

and/or store content, such as measurements, text, images, video, audio, etc. in the form of signals and/or states. Thus, a computing device, in this context, may comprise hardware, software, firmware, or any combination thereof (other than software per se). Computing device 1804, as depicted in FIG. 18, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1822 may store cookies relating to one or more users and may also comprise a computer-readable medium that may carry and/or make accessible content, including code and/or instructions, for example, executable by processor 1820 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

With advances in technology, it has become more typical to employ distributed computing approaches in which apportions of a computational problem may be allocated among computing devices, including one or more clients and one or more servers, via a computing and/or communications network, for example.

A network may comprise two or more network devices and/or may couple network devices so that signal communications, such as in the form of signal packets and/or frames, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of computer and/or machine readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network refers to a portion and/or part of a network. Sub-networks may also comprise links, such as physical links, connecting and/or coupling nodes to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting network communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate noes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known and/or later developed. The Internet includes local area networks (LANs), wide area networks (WANs), wireless networks, and/or long haul public networks that, for example, may allow signal packets and/or frames to be communicated between LANs. The term world wide web (WWW or web) and/or similar terms may also be used, although it refers to a sub-portion of the Internet that complies with the Hypertext Transfer Protocol or HTTP. For example, network devices may engage in an HTTP session through an exchange of Internet signal packets and/or frames. It is noted that there are several versions of the Hypertext Transfer Protocol. Here, the term Hypertext Transfer Protocol or HTTP is intended to refer to any version, now known and/or later developed. It is likewise noted that in various places in this document substitution of the term Internet with the term world wide web may be made without a significant departure in meaning and may, therefore, not be inappropriate in that the statement would remain correct with such a substitution.

Although claimed subject matter is not in particular limited in scope to the Internet or to the web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, and as mentioned above, the terms "WWW" and/or "web" refer to a sub-portion of the Internet that complies with the Hypertext Transfer Protocol or HTTP. The web, therefore, in this context, may comprise an Internet service that organizes stored content, such as, for example, text, images, video, etc., through the use of hypermedia, for example. A HyperText Markup Language ("HTML"), for example, may be utilized to specify content and/or format of hypermedia type content, such as in the form of a file or an "electronic document," such as a web page, for example. An Extensible Markup Language ("XML") may also be utilized to specify content and/or format of hypermedia type content, such as in the form of a file or an "electronic document," such as a web page, in an embodiment. Of course, HTML and XML are merely example languages provided as illustrations and, furthermore, HTML and/or XML is intended to refer to any version, now known and/or later developed. Likewise, claimed subject matter is not intended to be limited to examples provided as illustrations, of course.

The term "web site" and/or similar terms refer to a collection of related web pages, in an embodiment. The term "web page" and/or similar terms relates to any electronic file and/or electronic document, such as may be accessible via a network, by specifying a uniform resource locator (URL) for accessibility via the web, in an example embodiment. As alluded to above, a web page may comprise content coded using one or more languages, such as, for example, HTML and/or XML, in one or more embodiments. Although claimed subject matter is not limited in scope in this respect. Also, in one or more embodiments, developers may write code in the form of JavaScript, for example, to provide content to populate one or more templates, such as for an application. Here, JavaScript is intended to refer to any now known or future versions. However, JavaScript is merely an example programming language. As was mentioned, claimed subject matter is not limited to examples or illustrations.

Terms including "entry", "electronic entry", "document", "electronic document", "content", "digital content", "item", and/or similar terms are meant to refer to signals and/or states in a format, such as a digital format, that is perceivable by a user, such as if displayed and/or otherwise played by a device, such as a digital device, including, for example, a computing device. In an embodiment, "content" may comprise one or more signals and/or states to represent physical measurements generated by sensors, for example. For one or more embodiments, an electronic document may comprise a web page coded in a markup language, such as, for example, HTML (hypertext markup language). In another embodiment, an electronic document may comprise a portion and/or a region of a web page. However, claimed subject matter is not limited in these respects. Also, for one or more embodiments, an electronic document and/or electronic entry may comprise a number of components. Components in one or more embodiments may comprise text, for example as may be displayed on a web page. Also for one or more embodiments, components may comprise a graphical object, such as, for example, an image, such as a digital image, and/or sub-objects, such as attributes thereof. In an embodiment, digital content may comprise, for example, digital images, digital audio, digital video, and/or other types of electronic documents.

Signal packets and/or frames, also referred to as signal packet transmissions and/or signal frame transmissions, and may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path comprising a portion of the Internet, from a site via an access node coupled to the Internet. Likewise, a signal packet and/or frame may be forwarded via network nodes to a target site coupled to a local network, for example. A signal packet and/or frame communicated via the Internet, for example, may be routed via a path comprising one or more gateways, servers, etc. that may, for example, route a signal packet and/or frame in accordance with a target and/or destination address and availability of a network path of network nodes to the target and/or destination address. Although the Internet comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer model. Although physically connecting a network via a hardware bridge is done, a hardware bridge may not, by itself, typically include a capability of interoperability via higher level layers of a network protocol. A network protocol refers to a set of signaling conventions for computing and/or communications between and/or among devices in a network, typically network devices; for example, devices that substantially comply with the protocol and/or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol, such as protocols characterized substantially in accordance with the aforementioned OSI model, has several layers. These layers may be referred to here as a network stack. Various types of network transmissions may occur across various layers. A lowest level layer in a network stack, such as the so-called physical layer, may characterize how symbols (e.g., bits and/or bytes) are transmitted as one or more signals over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. Therefore, for example, a hardware bridge, by itself, may be unable to forward signal packets to a destination device since transmission of signal packets characterized at a higher-layer of a network stack may not be supported by a hardware bridge. Although higher-level layers of a network protocol may, for example, affect device permissions, user permissions, etc., a hardware bridge, for example, may typically provide little user control, such as for higher-level layer operations.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, NetBEUI, IPX and/or the like. Versions of the Internet Protocol (IP) may include IPv4, IPv6, other, and/or the like.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method comprising:
identifying, via least one computing device, one or more content objects comprising physical signals or physical states, or a combination thereof, representative of one or more physical attributes obtained from one or more physical objects or events, or a combination thereof;
generating one or more virtual physical objects at least in part via transformation, in accordance with one or more virtual physical laws, of the one or more identified content objects to reflect one or more virtual physical attributes that do not exist in a physical world in addition to or as replacement for, or a combination thereof, the one or more physical attributes of the identified content objects, wherein the one or more virtual physical objects comprise binary digital representations of content perceivable by a user;
evolving the one or more virtual physical objects over time substantially according to a set of principles specified for a particular virtual environment; and
generating user-perceivable output content comprising decreasing levels of detail for the one or more virtual physical objects for a corresponding plurality of sequential periods of time via the at least one computing device, wherein the plurality of sequential periods of time comprises a time compression zone for a particular period of time of the plurality of sequential periods of time depicting a discontinuous decrease in velocity for at least one of the one or more virtual physical objects entering the time compression zone.

2. The method of claim 1, wherein the physical signals or physical states, or the combination thereof, comprise sensor measurements, wherein the generating the one or more virtual physical objects comprises generating the one or more virtual physical objects based at least in part on the sensor measurements.

3. The method of claim 2, wherein the generating the user-perceivable output content comprising the decreasing levels of detail for the one or more virtual physical objects for the corresponding plurality of sequential periods of time includes reducing an amount of detail for less-recently generated and/or inactive virtual physical objects while maintaining a greater amount of detail for more recently generated and/or active virtual physical objects or coalescing a subset of non-active virtual physical objects after a specified period of time, or a combination thereof.

4. The method of claim 3, wherein the generating the one or more virtual physical objects comprises:
obtaining the one or more identified content objects from one or more sensors; and
injecting the one or more virtual physical objects into the virtual environment.

5. The method of claim 4, further comprising:
evolving the particular virtual environment based at least in part on the set of principles specified for the particular virtual environment and on obtaining further identified content objects;
generating graphics content representative of the evolving virtual environment; and
displaying the graphics content representative of the evolving virtual environment.

6. The method of claim 1, wherein the generating the one or more virtual physical objects comprises assigning the one or more virtual physical attributes to the one or more virtual physical objects substantially in accordance with the one or more virtual physical laws or in accordance with one or more assignment rules, or a combination thereof.

7. The method of claim 6, wherein the physical signals or physical states, or the combination thereof, comprise sensor measurements, and wherein the assigning the one or more virtual physical attributes to the one or more virtual physical objects comprises assigning the one or more virtual physical attributes based at least in part on the sensor measurements.

8. The method of claim 1, wherein the generating the user-perceivable output content comprises generating graphics content, the method further comprising:
displaying the generated graphics content; and
recognizing a user interaction with the particular virtual environment via one or more interfaces.

9. The method of claim 8, further comprising re-physicalizing the user interaction such that the user interaction results in an alteration of one or more aspects of the particular virtual environment.

10. An apparatus comprising: a computing device to:

identify one or more content objects to comprise physical signals or physical states, or a combination thereof, representative of one or more physical attributes to be obtained from one or more physical objects or events, or a combination thereof;

generate one or more virtual physical objects based at least in part via transformation, in accordance with one or more virtual physical laws, of the one or more content objects to be identified to reflect one or more virtual physical attributes that do not exist in a physical world in addition to or as replacement for, or a combination thereof, the one or more physical attributes of the content objects to be identified, wherein the one or more virtual physical objects to comprise binary digital representations of content perceivable by a user;

evolve the one or more virtual physical objects over time substantially in accordance with a set of principles to be specified for a particular virtual environment; and generate user-perceivable output content to comprise decreasing levels of detail for the one or more virtual physical objects for a corresponding plurality of sequential periods of time, wherein the plurality of sequential periods of time to comprise a time compression zone for a particular period of time of the plurality of sequential periods of time depicting a discontinuous decrease in velocity for at least one of the one or more virtual physical objects to enter the time compression zone.

11. The apparatus of claim 10, wherein the physical signals or physical states, or the combination thereof, to comprise sensor measurements, wherein the computing device to generate the one or more virtual physical objects based at least in part on the sensor measurements.

12. The apparatus of claim 11, wherein, the user-perceivable output content to comprise the decreasing levels of detail for the one or more virtual physical objects for the corresponding plurality of sequential periods of time, reduce an amount of detail for less-recently generated and/or inactive virtual physical objects while maintaining a greater amount of detail for more recently generated and/or active virtual physical objects, or coalesce a subset of non-active virtual physical objects after a specified period of time, or a combination thereof.

13. The apparatus of claim 12, wherein the computing device further to endow the one or more virtual physical objects with the one or more virtual physical attributes based at least in part on the sensor measurements.

14. The apparatus of claim 12, wherein to generate the one or more virtual physical objects, the computing device further to:

obtain the one or more content objects to be identified from one or more sensors; and inject the one or more virtual physical objects into the particular virtual environment.

15. The apparatus of claim 14, wherein the computing device further to:

evolve the particular virtual environment based at least in part on the set of principles to be specified for the particular virtual environment and on obtaining further content objects;

generate graphics content representative of the particular virtual environment to be evolved; and display the graphics content representative of the particular virtual environment to be evolved.

16. The apparatus of claim 10, wherein the computing device further to endow the one or more virtual physical objects with the one or more virtual physical attributes substantially in accordance with the one or more virtual physical laws or in accordance with one or more assignment rules, or a combination thereof.

17. The apparatus of claim 10, wherein the computing device to generate the graphics content, the computing device further to:

display the generated graphics content; and recognize a user interaction with the particular virtual environment via one or more interfaces.

18. The apparatus of claim 17, wherein the computing device to re-physicalize the user interaction such that the user interaction to result in an alteration of one or more aspects of the particular virtual environment.

19. The apparatus of claim 10, wherein the computing device to comprise a game console.

20. An article comprising: a non-transitory storage medium having stored thereon instructions executable by a computing device to:

identify one or more content objects to comprise physical signals or physical states, or a combination thereof, representative of one or more physical attributes to be obtained from one or more physical objects or events, or a combination thereof;

generate one or more virtual physical objects based at least in part via transformation, in accordance with one or more virtual physical laws, of the one or more content objects to be identified to reflect one or more virtual physical attributes that do not exist in a physical world in addition to or as replacement for, or a combination thereof, the one or more physical attributes of the content objects to be identified, wherein the one or more virtual physical objects to comprise binary digital representations of content perceivable by a user;

evolve the one or more virtual physical objects over time substantially in accordance with a set of principles to be specified for a particular virtual environment; and generate user-perceivable output content to comprise decreasing levels of detail for the one or more virtual physical objects for a corresponding plurality of sequential periods of time, wherein the plurality of sequential periods of time to comprise a time compression zone for a particular period of time of the plurality of sequential periods of time depicting a discontinuous decrease in velocity for at least one of the one or more virtual physical objects to enter the time compression zone.

21. The article of claim 20, wherein the physical signals or physical states, or the combination thereof, comprise sensor measurements, wherein the computing device to generate the one or more virtual physical objects based at least in part on the sensor measurements.

22. The article of claim 20, wherein, to generate the user-perceivable output content to comprise the decreasing levels of detail for the one or more virtual physical objects for the corresponding plurality of sequential periods of time, the storage medium having stored thereon further instructions executable by the computing device to reduce an amount of detail for less-recently generated and/or inactive virtual physical objects and to maintain a greater amount of detail for more recently generated and/or active virtual physical objects, or to coalesce a subset of non-active virtual physical objects after a specified period of time, or a combination thereof.

23. The article of claim 22, wherein the storage medium having stored thereon further instructions executable by the computing device to endow the one or more virtual physical objects with the one or more virtual physical attributes based at least in part on the sensor measurements.

24. The article of claim 22, wherein the storage medium having stored thereon further instructions executable by the computing device to:
    obtain the one or more identified content objects to be identified from one or more sensors; and
    inject the one or more virtual physical objects into the particular virtual environment.

25. The article of claim 24, wherein the storage medium has stored thereon further instructions executable by the computing device to:
    evolve the particular virtual environment based at least in part on the set of principles to be specified for the particular virtual environment and on obtaining further content objects;
    generate graphics content representative of the particular virtual environment to be evolved; and
    display the graphics content representative of the particular virtual environment to be evolved.

26. The article of claim 20, wherein the storage medium having stored thereon further instructions executable by the computing device to endow the one or more virtual physical objects with the one or more virtual physical attributes substantially in accordance with the one or more virtual physic laws or in accordance with one or more assignment rules, or a combination thereof.

27. The article of claim 20, wherein the storage medium having stored thereon further instructions executable by the computing device to generate graphics content, the computing device further to:
    display the generated graphics content; and
    recognize a user interaction with the particular virtual environment via one or more interfaces.

28. The article of claim 27, wherein the storage medium having stored thereon further instructions executable by the computing device to re-physicalize the user interaction such that the user interaction to result in an alteration of one or more aspects of the particular virtual environment.

* * * * *